US008920172B1

(12) United States Patent
Wilmink et al.

(10) Patent No.: US 8,920,172 B1
(45) Date of Patent: Dec. 30, 2014

(54) METHOD AND SYSTEM FOR TRACKING HARDWARE IN A MOTION CAPTURE ENVIRONMENT

(75) Inventors: Ronnie Johannes Hendrikus Wilmink, Marietta, GA (US); Nels Howard Madsen, Auburn, AL (US); Thomas Michael McLaughlin, Miramar Beach, FL (US)

(73) Assignee: Motion Reality, Inc., Marietta, GA (US)

( * ) Notice: Subject to any disclaimer, the term of this patent is extended or adjusted under 35 U.S.C. 154(b) by 399 days.

(21) Appl. No.: 13/421,669

(22) Filed: Mar. 15, 2012

Related U.S. Application Data

(60) Provisional application No. 61/452,829, filed on Mar. 15, 2011, provisional application No. 61/508,859, filed on Jul. 18, 2011.

(51) Int. Cl.
*F41G 3/26* (2006.01)

(52) U.S. Cl.
USPC .......................................................... 434/19

(58) Field of Classification Search
None
See application file for complete search history.

(56) References Cited

U.S. PATENT DOCUMENTS

| | | | | |
|---|---|---|---|---|
| 6,061,644 | A  * | 5/2000 | Leis | 702/153 |
| 2007/0219744 | A1 * | 9/2007 | Kolen | 702/150 |
| 2008/0300055 | A1 * | 12/2008 | Lutnick et al. | 463/39 |
| 2009/0046152 | A1 * | 2/2009 | Aman | 348/157 |
| 2009/0081619 | A1 * | 3/2009 | Miasnik | 434/21 |
| 2010/0221685 | A1 * | 9/2010 | Carter | 434/19 |
| 2010/0229443 | A1 * | 9/2010 | Wasmer | 42/1.05 |
| 2012/0156652 | A1 * | 6/2012 | Lane et al. | 434/11 |

* cited by examiner

*Primary Examiner* — Stephen R Koziol
*Assistant Examiner* — Delomia Gilliard
(74) *Attorney, Agent, or Firm* — King & Spalding

(57) ABSTRACT

A participant in a motion capture environment, such as a motion capture simulation, can utilize or interact with physical objects disposed in the environment, for example weapons, sporting goods, and wands. Markers attached to the physical objects can track movement of the objects in the motion capture environment as well as changes in operational state associated with participant interaction or usage. Markers on an object can be passive, active, or a combination of active and passive. A change in separation between two passive or active markers on a mechanized physical object can indicate that a participant has engaged a mechanism of the object, for example firing a semiautomatic weapon. One or more active markers can emit a pattern of light that is modulated spatially or temporally to report operational state of an object, such as when a participant has fired the weapon or turned a weapon safety off or on.

3 Claims, 15 Drawing Sheets

| STATE | FRONT LED | REAR LED |
|---|---|---|
| Safety OFF / firing enabled | OFF | ON (continuous) |
| 720<br>Firing | ON<br>45 ms pulse | OFF |
| Safety ON / firing disabled | OFF | OFF |
| Reserved | ON | ON |

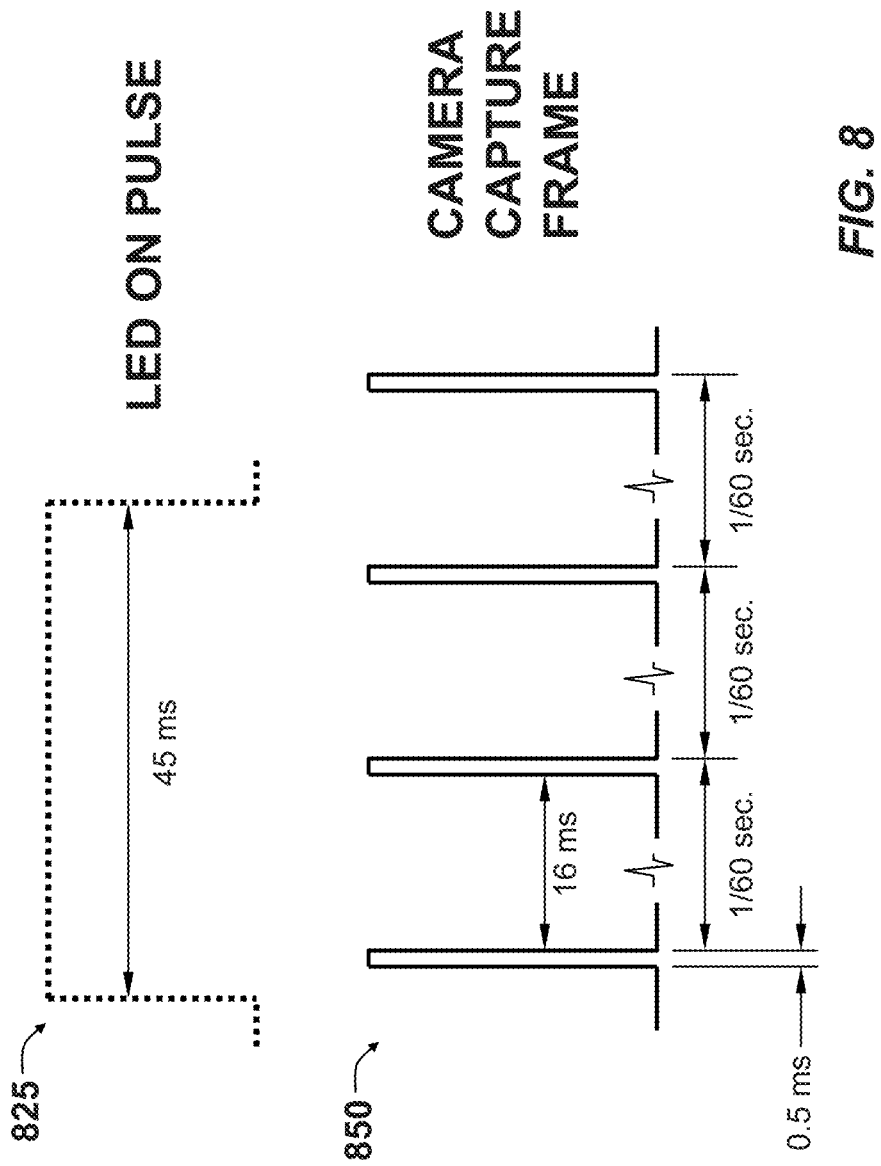

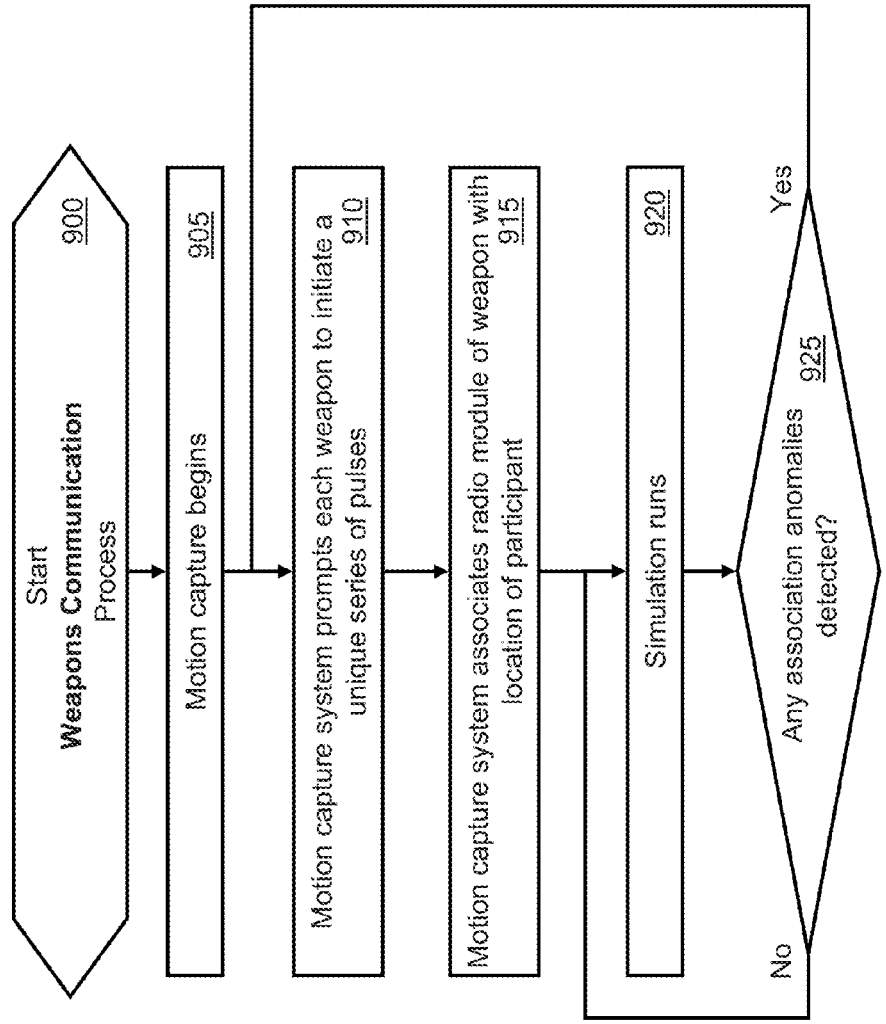

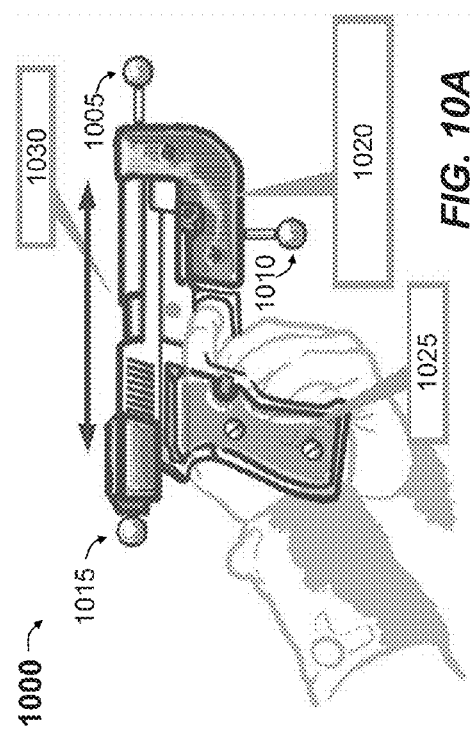
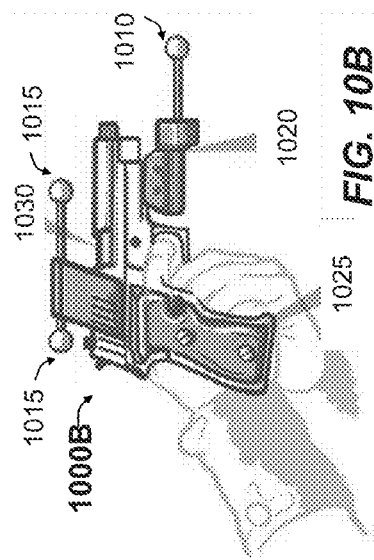
FIG. 10A
FIG. 10B

METHOD AND SYSTEM FOR TRACKING HARDWARE IN A MOTION CAPTURE ENVIRONMENT

CROSS REFERENCE TO RELATED APPLICATIONS

This application claims priority to U.S. Provisional Patent Application No. 61/452,829 filed Mar. 15, 2011 in the name of Ronnie J. H. Wilmink, Nels Howard Madsen, and Thomas Michael McLaughlin and entitled "Weapon Hardware for a Sensory Immersive Motion Capture Simulation System," the entire contents of which are hereby incorporated herein by reference. This application further claims priority to U.S. Provisional Patent Application No. 61/508,859 filed Jul. 18, 2011 in the name of Ronnie Johannes Hendrikus Wilmink, Nels Howard Madsen, and Thomas Michael McLaughlin and entitled "Weapons for a Motion Capture Simulation System," the entire contents of which are hereby incorporated herein by reference.

FIELD OF THE TECHNOLOGY

The present technology relates to tracking and identifying items, such as weapons and handheld implements, utilizing active and/or passive markers in a motion capture environment.

BACKGROUND

Training in realistic situations often yields substantial performance improvement. And like many activities, users of weapons typically become more proficient with increased experience. However, amassing high-value experience with weapons poses unique training challenges, as most real weapons can be inherently dangerous.

In one conventional weapons-based training exercise, a trainee uses a weapon model or real weapon to aim at a two-dimensional training scenario displayed on a video wall (such as a projection screen or large screen monitor). When firing the weapon, a beam of laser light projects onto the video wall, where a 'hit location' is picked up by a sensor, such as a camera trained on the screen where the trainee is aiming. The camera and its associated system measures accuracy of the shot. Due to the nature of this method, the system typically remains unaware of the location/aim of the weapon until the weapon is fired. Likewise, the location/position of the trainee is typically lost. A limitation of such conventional systems concerns realism, as the trainee generally remains un-immersed in the scenario.

Another conventional training method relies on using weapons in a shoot house, where the weapons either fire real ammunition, less-lethal rounds (sim-rounds of various kinds), or paint-balls. Rather than in simulation, training occurs in mock-up or abandoned houses or even complete villages. While such training can seem very real, costs of different scenarios is typically high, and modifying a scenario involves difficulties as hard-scapes need to be moved or created to change between one simulation and another. Additionally, using real ammunition is dangerous as well as expensive, as the mock-ups become damaged during training and have to be rebuilt periodically. While immersive in nature, such conventional training can be cost prohibitive, and, depending on the type of rounds used, can further be very dangerous, especially for group- and squad-level training.

In view of the foregoing discussion of representative shortcomings in the art, need for improved training technology, for weapons as well as other activities, is apparent. Need is further apparent for technology for capturing and recreating real-world scenarios, in training and other contexts. Need further exists for technology for tracking and providing information about physical objects utilized in training simulations, including how trainees are interacting with such objects and how objects may change or undergo state changes in connection with trainee interaction. Need further exists for improving information latency and/or transmission rates in motion capture environments. A capability addressing such need, or some other related deficiency in the art, would support enhancements in training, simulation, and motion capture, as well as other applications.

SUMMARY

Inanimate physical objects disposed and/or utilized in a motion capture environment can present indicators of operational state for capture by a computer-based system associated with motion capture simulation or other motion capture application or activity. Such physical objects can comprise motion capture implements.

The term "motion capture implement," as used herein, generally refers to any inanimate physical object that a participant in a motion capture environment uses, where a machine tracks movement, operation, and/or state change of the inanimate physical object in the motion capture environment. To mention a few representative examples without attempting to be exhaustive, a motion capture implement could be a shoulder fired gun, a pistol, an assault rifle, a cannon, a baton, a hand grenade, a minigun, a mounted machinegun, a knife or bayonet, a tennis racket, a pointer or wand, or a golf club. Markers attached to a motion capture implement can track or report movement, position, and/or orientation of the motion capture implement in the motion capture environment. The markers can further track and/or report change in operational state of the motion capture implement, for example associated with participant interaction or usage. A motion capture implement can have passive markers, active markers, or a combination of active and passive markers for reporting positional and operational information.

In one aspect of the present invention, a participant in a motion capture environment can utilize or interact with one or more motion capture implements. In one representative option, a change in separation between two passive markers on a mechanized motion capture implement can indicate a change in operational state. For example, a mechanized motion capture implement can comprise elements that move relative to other elements, such as a bolt or slide on a semi-automatic gun moving relative to the gun's barrel or frame when the gun is fired. One passive marker can be attached to the stationary element, and another passive marker can be attached to the moving element. An overhead camera or other monitor can detect change in operational state by observing relative positions of the markers. For example, a camera-based system can determine that the gun has been fired when the system observes a change in separation between the two markers as the gun's action cycles. In certain situations, a motion capture implement outfitted with passive markers can further utilize active radio frequency technology to communicate additional information about the implement.

In another representative option, one or more active markers can emit a pattern of light that is modulated to report operational state of a mechanized motion capture implement, such as when a participant has turned a weapon safety off or on. For example, a pair of light emitting diodes ("LEDs") can be individually activated so that both are on or one is on and the other off when the weapon is fired or otherwise undergoes a state change. Accordingly, a camera-based system can detect a change in operational state by monitoring for spatial modulation of light produced at the motion capture implement. Alternatively, light produced at the motion capture implement can be temporally modulated to convey information about operational state of the motion capture implement. For example, a light emitting diode can be pulsed in a particular sequence when a participant changes an operational state of the associated motion capture implement. Additionally, the light emitting diodes of different motion capture implements can be pulsed differently for identification purposes. For example, in a motion capture military training exercise involving numerous participants, each participant's weapon can have a unique pulse code that an overhead camera can detect, thereby distinguishing among the weapons and their associated users. In certain situations, a motion capture implement outfitted with active markers can further utilize active radio frequency technology to communicate additional information about the implement.

The foregoing discussion of motion capture hardware is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the present invention, and are to be protected by the accompanying claims.

BRIEF DESCRIPTION OF THE DRAWINGS

FIG. 7 is an illustration of a table of active marker states for conveying operational states of a motion capture implement associated with motion capture simulation according to certain exemplary embodiments of the present invention.

FIG. 8 is an illustration of signal traces describing active marker activation times and camera acquisition times for conveying operational states of a motion capture implement associated with motion capture simulation according to certain exemplary embodiments of the present invention.

FIG. 9 is an illustration of a flowchart of a process in which active markers convey operational state information about a motion capture implement associated with motion capture simulation according to certain exemplary embodiments of the present invention.

FIG. 10A is an illustration of a weapon, specifically a semiautomatic handgun as an embodiment of a motion capture implement, associated with motion capture simulation according to certain exemplary embodiments of the present invention.

FIG. 10B is an illustration of a weapon, specifically a semiautomatic handgun as an embodiment of a motion capture implement, associated with motion capture simulation according to certain exemplary embodiments of the present invention.

Figure 1:
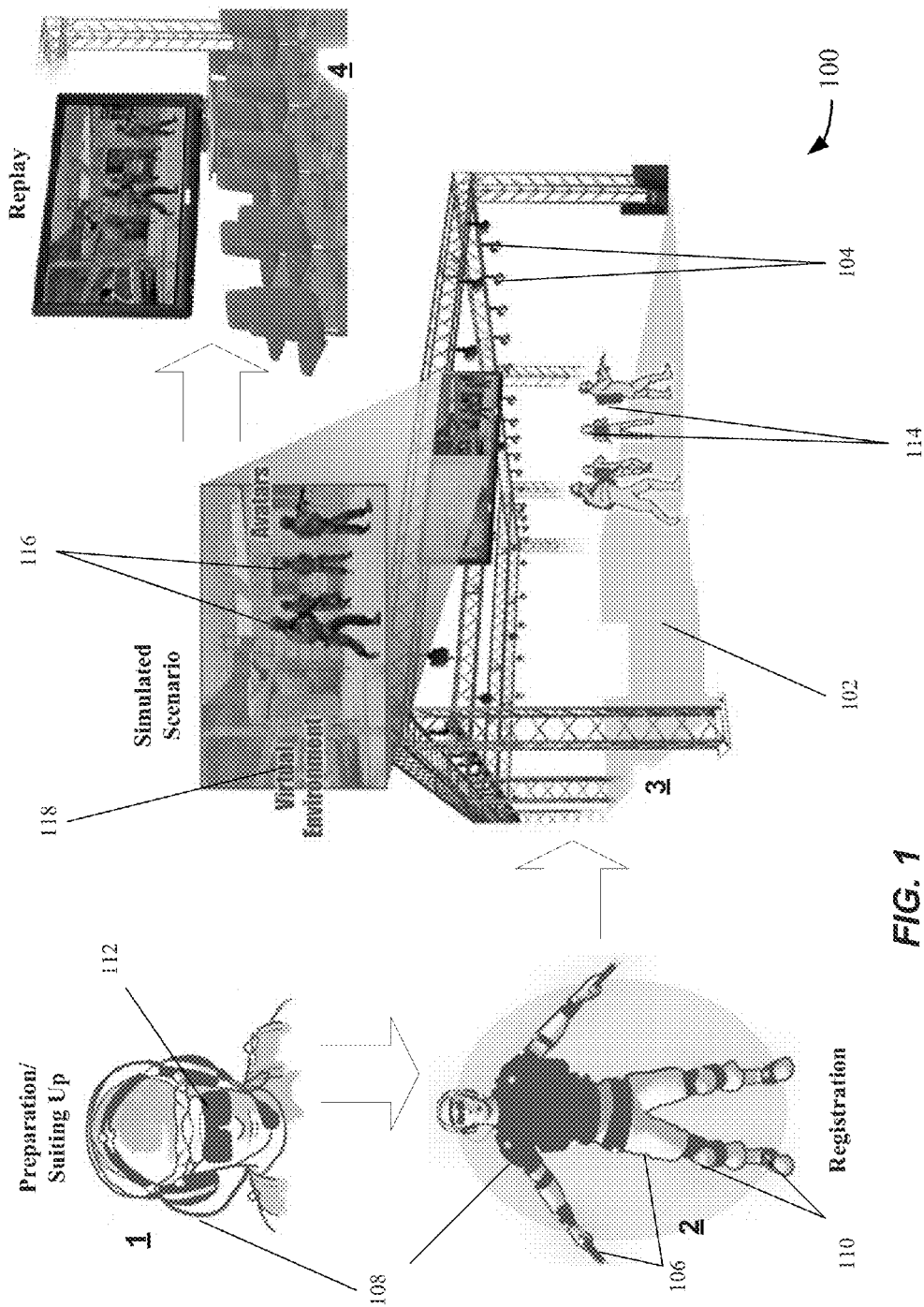
FIG. 1 is an illustration of a system that is useful for motion capture simulation according to certain exemplary embodiments of the present invention.

Many aspects of the invention can be better understood with reference to the above drawings. The elements and features shown in the drawings are not to scale, emphasis instead being placed upon clearly illustrating the principles of exemplary embodiments of the present invention. Moreover, certain dimensions may be exaggerated to help visually convey such principles. In the drawings, reference numerals designate like or corresponding, but not necessarily identical, elements throughout the several views.

DESCRIPTION OF EXEMPLARY EMBODIMENTS

Participants in a motion capture environment can be immersed in a motion capture simulation, for example preparing for a military activity or training for another event, that might involve recreation, sports, professional duties, or non-military weapon practice. The participants may interact with motion capture implements, such as hardware associated with a simulated scenario. Markers can be attached to or otherwise associated with a motion capture implement. The markers can actively or passively convey information about the motion capture implement to a computer-based system associated with the motion capture simulation. For example, a change in operational state of the motion capture implement can trigger a change in the markers that can be captured by a camera or other monitor. So triggered, the markers can communicate by modulating light in space or in time, thereby providing a capturable light pattern encoded with information about the motion capture implement.

In certain exemplary embodiments of the present invention, a participant can utilize a model of a weapon or a weapon that has been rendered non-lethal in a motion capture simulator. The participant can thus experience and benefit from weapons training that otherwise would be difficult, dangerous, or prohibitively expensive.

In certain exemplary embodiments of the present invention, an implementation of a weapon is used in a motion capture simulation system (as one embodiment of a motion capture environment). Since using real weapons for realistic training situations can pose inordinate risk to the trainees, a modified weapon can be beneficially substituted. For example, a realistic model of a weapon (or a disabled real weapon) can be used in the motion capture trainer. To enhance the training experience and to bolster training results, it is often desirable for the implementation to resemble the actual weapon.

The word "weapon" (or "weapons"), as used herein without a modifier or a limiting adjective, is generally broad, encompassing actual, lethal weapons as well as disabled weapons and models of weapons that are non-lethal or less potent than actual weapons used in combat or similar activities.

In certain exemplary embodiments of the present invention, a training simulator provides a close relationship between a virtual weapon and a physical motion capture implement the trainee is using. This relationship can be supported by tracking the location and operational state of the motion capture implement throughout a training session. As will be discussed in further detail below, location and operational state of the motion capture implement can be tracked, including via motion capture.

The term "operational state," as used herein in the context of a motion capture implement, generally refers to one or more measured or inferred operational or operating parameters, conditions, or settings of the motion capture implement. An operational state of a firearm, could include the state of one or more switches or settings of the firearm, level of ammunition remaining in the magazine, whether the firearm is jammed or damaged, presence of a magazine, or one or more simulated/estimated external factors affecting operation, such as temperature and humidity.

In certain embodiments, state and location of the motion capture implement can be determined by a motion capture simulation system via placement of optical tracking markers on the implement and/or radio frequency communication to the system. In a typical application, the location and orientation of each motion capture implement is ascertained by the system via monitoring the optical tracking markers. One or more tracking markers can be used to communicate the state of the motion capture implement as well, as described in further detail below.

The term "tracking marker," as used herein, generally refers to a marker on (including inside) a motion capture implement or on a participant that can be identified by a motion capture sensor or monitor, for example via an overhead camera or vision system. Tracking markers can provide additional information, such as by encoding light with state information about a motion capture implement. Representative examples of tracking markers include, without limitation, a piece of reflective tape, a retroreflective element, a partially round reflective marker, or an active marker such as a light in the form of a light emitting diode, a laser, an optoelectronic device, an incandescent lamp, or another element that converts electricity into light. Such light may be visible or infrared, for example. The term "marker," as used herein, generally refers to a device on (including inside) a motion capture implement or participant for providing information about the motion capture implement or participant to a motion capture simulation system. Markers include tracking markers. Markers can provide operational state information, positional information, or other relevant information using light, radio frequency communication, or other appropriate communication technology, either passive or active, for example. Radio communication between the motion capture implement and a motion capture monitor or system can be uni or bidirectional, either direct or via multiple nodes/hops.

With actual, physical location and state of a motion capture implement known to a simulation-based training system, the system can place a virtual implement with corresponding parameters (for example, location, orientation, and state) in the virtual world where physical manipulation of the implement has a one-to-one relationship to the corresponding implement in the virtual world. In other words, a computer-based system can generate a virtual representation of the actual motion capture implement, with a high level of correspondence between the physical and computer-generated elements. Accordingly, a motion capture based training simulator may utilize markers to achieve suitable synchronization between physical and virtual elements, and such markers may provide one, multiple, all relevant, or a selected subset of relevant state parameters of a motion capture implement.

Figure 11:
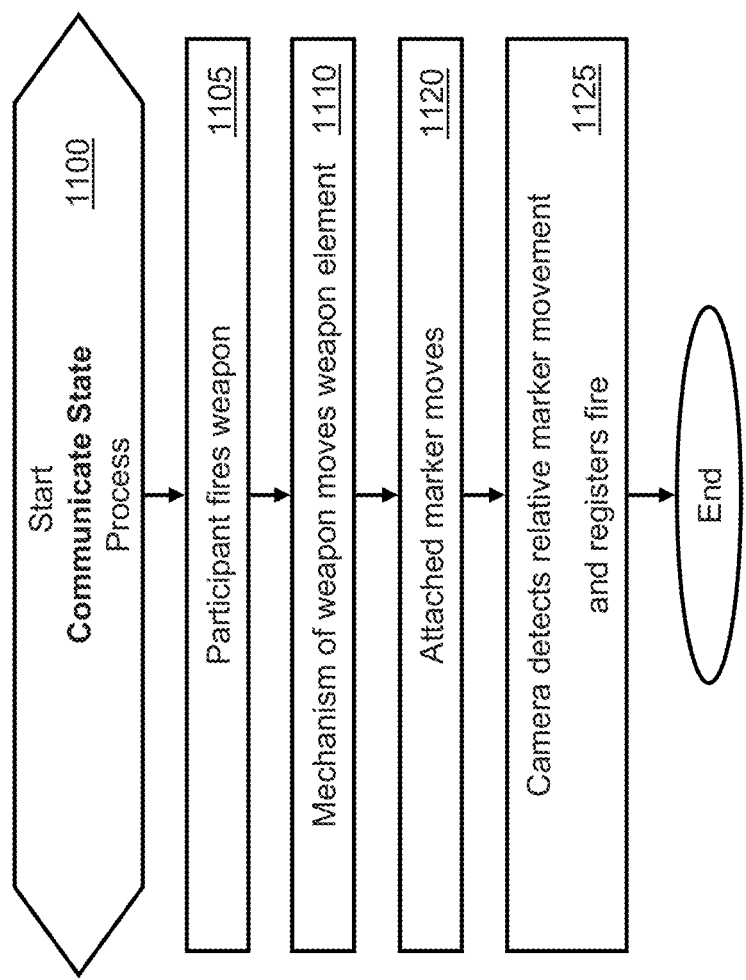
FIG. 11 is an illustration of a flowchart of a process in which passive markers convey operational state information about a motion capture implement associated with motion capture simulation according to certain exemplary embodiments of the present invention.
Figure 12:
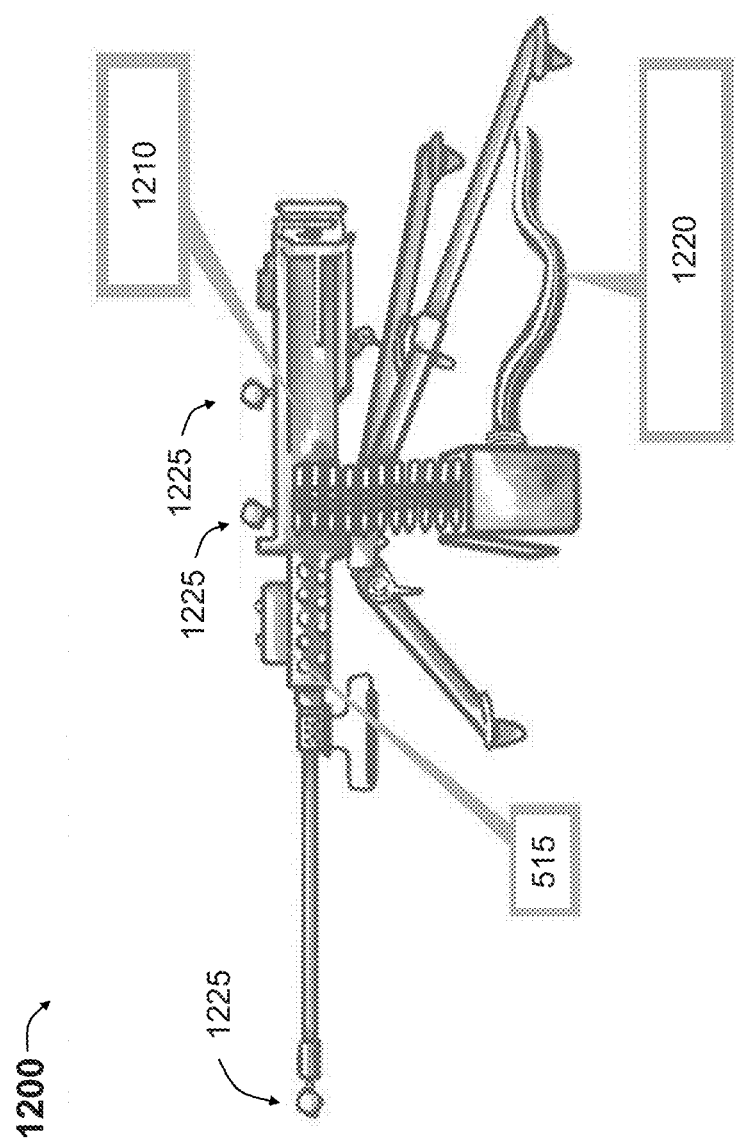
FIG. 12 is an illustration of a weapon, specifically a fully automatic machinegun as an embodiment of a motion capture implement, associated with motion capture simulation according to certain exemplary embodiments of the present invention.
Figure 13:
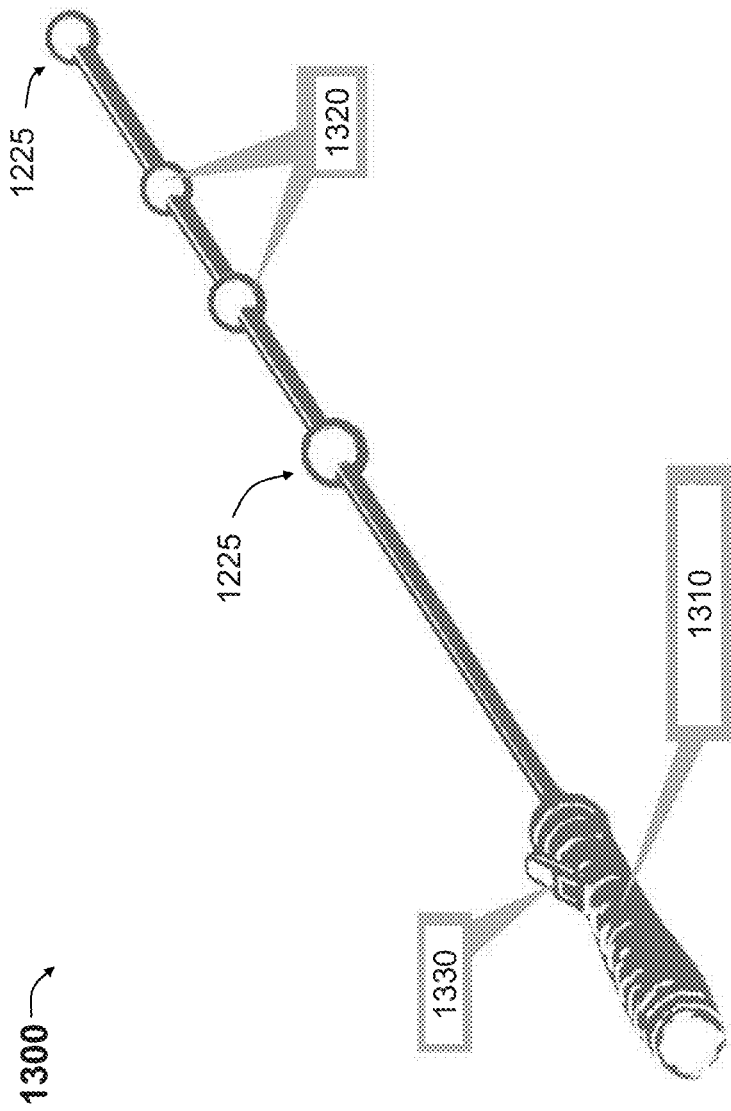
FIG. 13 is an illustration of a wand, as an embodiment of a motion capture implement, associated with motion capture simulation according to certain exemplary embodiments of the present invention.
Figure 14:
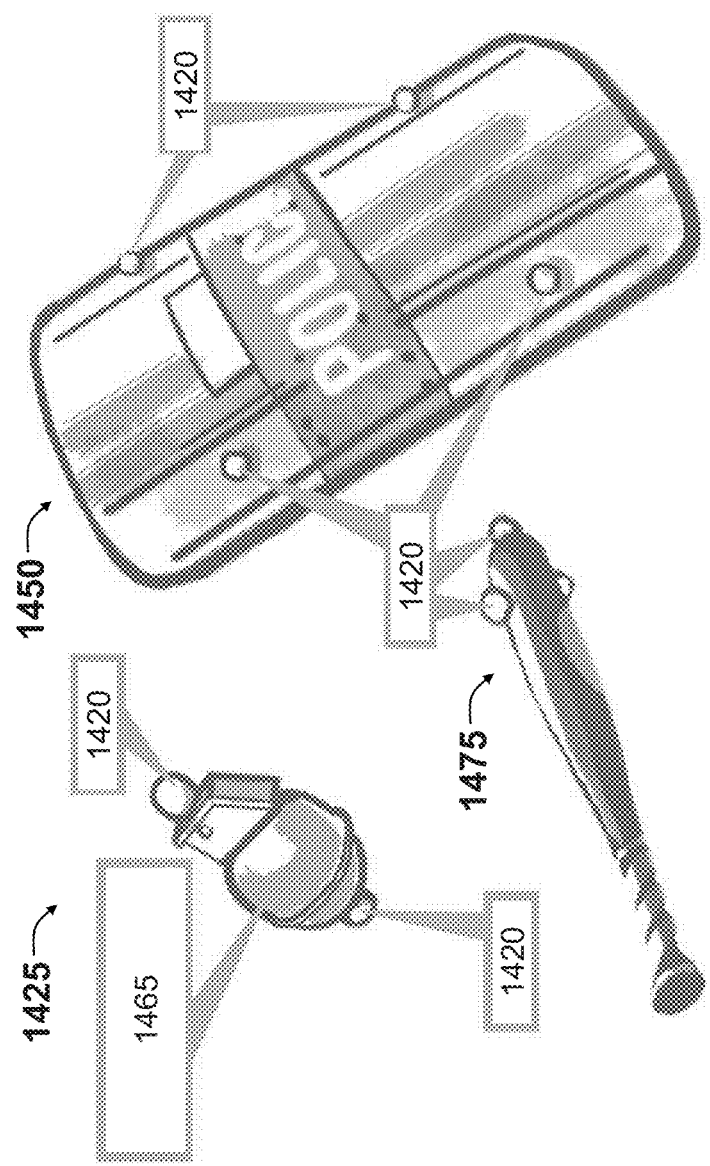
FIG. 14 is an illustration of three weapons, as embodiments of motion capture implements, associated with motion capture simulation according to certain exemplary embodiments of the present invention.

Technology for obtaining information about hardware in a motion capture environment will now be described more fully with reference to FIGS. 1-14, which describe representative embodiments of the present invention. FIGS. 1, 2, 3, and 4 describe a representative motion capture simulation system, as an exemplary embodiment of a motion capture environment. FIGS. 5, 6, 7, 8, and 9 describe using active markers to provide capturable state information about a motion capture implement. FIGS. 10 and 11 describe using passive markers to provide capturable state information about a motion capture implement. FIGS. 12, 13, and 14 illustrate additional representative motion capture implements.

The present invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting and among others supported by representations of the present invention.

Moving now to discuss the figures further, an exemplary embodiment of the present invention will be described in detail. First, FIGS. 1-4 will be discussed in the context of describing a representative operating environment suitable for practicing certain embodiments of the present invention. Then, the remaining FIGS. 5-14 will be discussed, making exemplary reference back to FIGS. 1-4 as may be appropriate or helpful.

Figure 2:
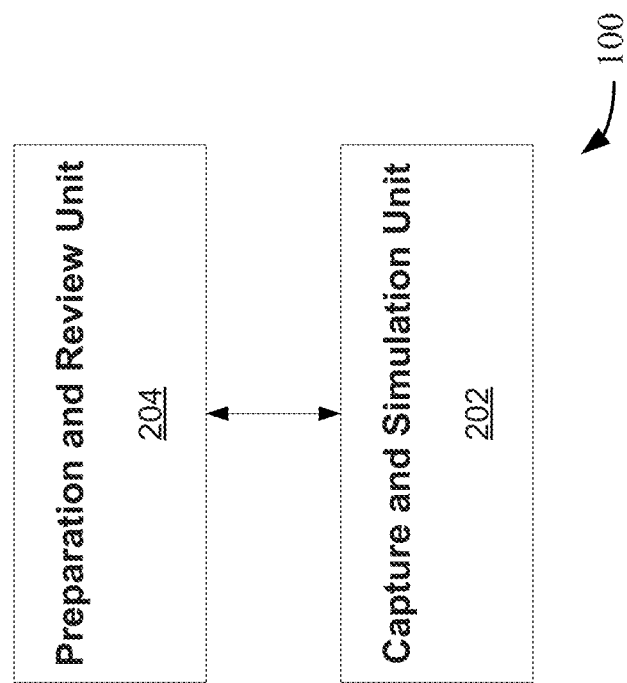
FIG. 2 is an illustration of a functional block diagram for a system that supports motion capture simulation according to certain exemplary embodiments of the present invention.
Figure 3:
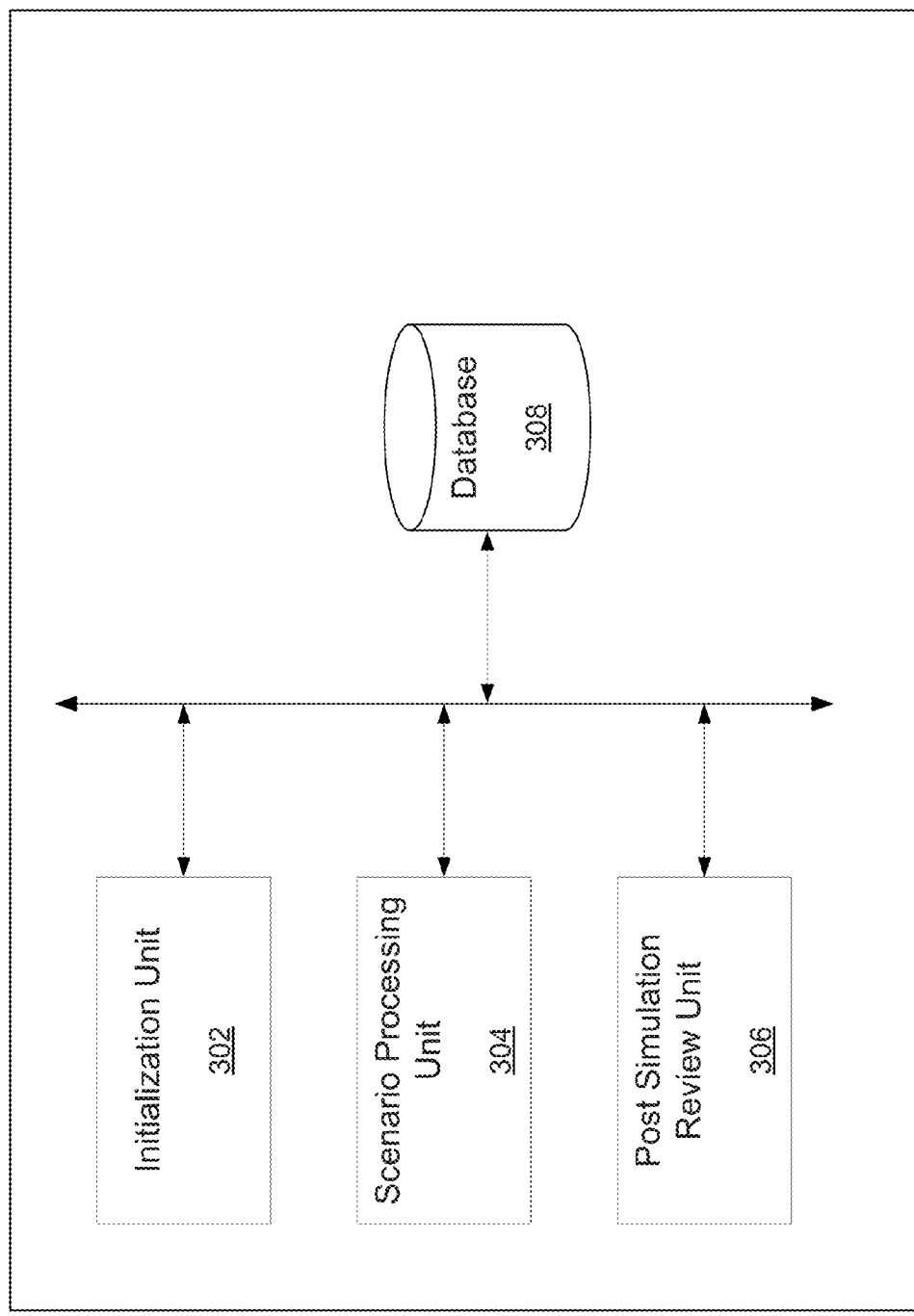
FIG. 3 is an illustration of a functional block diagram for a system supporting preparation and review associated with motion capture simulation according to certain exemplary embodiments of the present invention.
Figure 4:
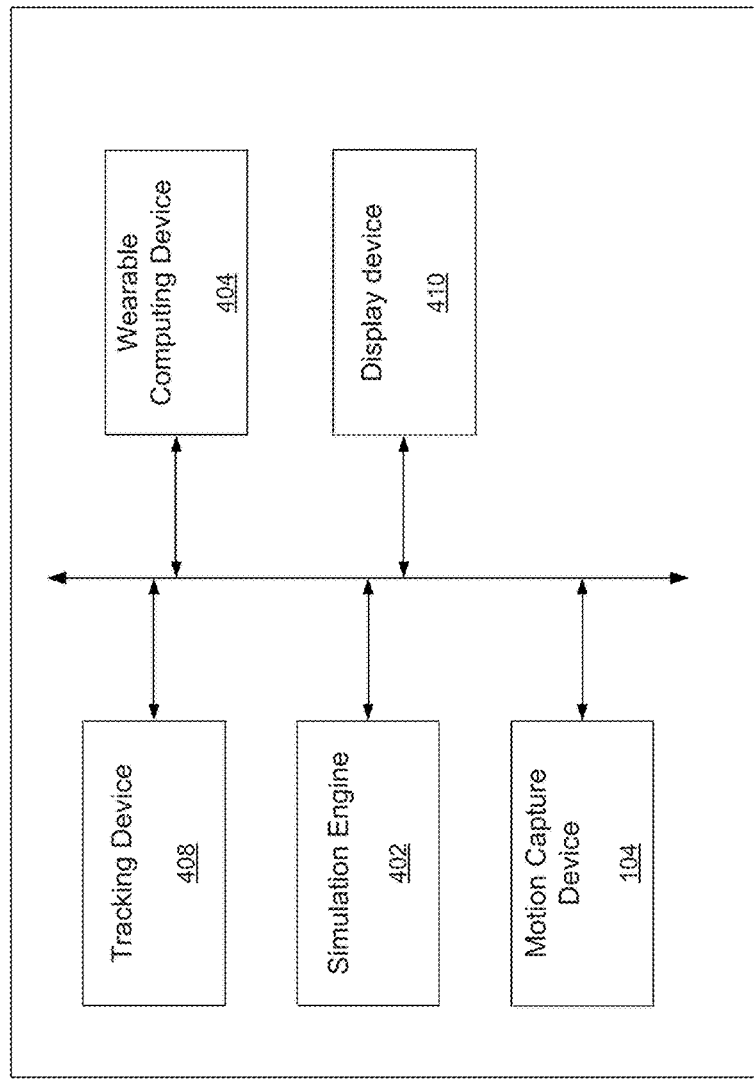
FIG. 4 is an illustration of a functional block diagram of system supporting capture and simulation associated with motion capture simulation according to certain exemplary embodiments of the present invention.

As further discussed below and in accordance with certain embodiments of the present invention, FIG. 1 illustrates an exemplary system that is useful for motion capture simulation, while FIGS. 2, 3, and 4 illustrate exemplary system elements.

Referring now to FIG. 1, this figure illustrates an exemplary sensory immersive motion capture simulation system 100, according to one or more embodiments. In particular, FIG. 1 illustrates a capture volume 102, a motion capture device 104, a capture entity 106, a wearable gear 108, markers 110 coupled to the wearable gear 108, a head mounted display device (hereinafter "HMD" device) 112, a wearable computing device 114, a simulated virtual environment 118, and a virtual representation of an entity (hereinafter "capture entity's avatar") 116.

In one embodiment, a sensory immersive motion capture simulation system 100 (hereinafter "motion capture simulation system") can provide a near real-time sensory immersion of a capture entity 106 into a three-dimensional simulated virtual environment 118 (hereinafter "simulated virtual environment" 118). A sensory immersion experience can be characterized as a user's experience where the user's mind perceives a simulated virtual environment substantially as if it were real and/or interacts with the simulated virtual environment substantially as if it were real.

In the simulated virtual environment 118, the capture entity 106 can be represented by an avatar 116. Using a capture and simulation unit 202 (shown in FIG. 2), the motion capture simulation system 100 can characterize movements and/or actions of the capture entity 106 with high fidelity. Further, the movements and actions of the capture entity 106 can be nearly immediately and accurately translated into corresponding movements and actions of the capture entity's avatar 116 in the simulated virtual environment 118. For example, when a capture entity 106 walks in the capture volume 102, nearly simultaneously the capture entity's avatar walks in the simulated virtual environment 118 based on the capture entity's 106 walking motion that is captured using the capture and simulation unit 202. Similarly, when the capture entity 106 crawls in the capture volume 102, nearly simultaneously the capture entity's avatar crawls in the simulated virtual environment 118 based on the capture entity's 106 crawling motion that is captured using the capture and simulation unit 202. In one embodiment, movement and/or action of a capture entity 106 in the space represented by the capture volume 102 can be recorded and/or captured using the motion capture device 104 of the capture and simulation unit 202. The capture and simulation unit 202 and the motion capture device 104 are described in further detail below, in connection with FIG. 2 and FIG. 4.

In one embodiment, the capture entity 106 can be any object in the capture volume 102 that is motion captured into the simulated virtual environment 118 using a motion capture device 104. In one embodiment, the capture entity 106 can be a living being (participant), such as a human being. In another embodiment, the capture entity 106 can be both a participant and an equipment (weapon, racket, wand, stick, etc.) associated with the participant, such as a weapon held by a human being. In another embodiment, the capture entity 106 can be an ammunition and/or a model of the ammunition carried by the living being. In yet another embodiment, the capture entity 106 can be any physical or mechanical body including a physical prop in the capture volume 102.

In one embodiment, the simulated virtual environment 116 can contain a number of avatars. In one embodiment, each avatar of the number of avatars can represent a number of capture entities 106a-n respectively. In another embodiment, each avatar can represent a simulated character whose behavior is driven by artificial intelligence ("AI") algorithms (hereinafter "virtual character"). In an exemplary embodiment, such a virtual character can be characterized as an AI character. The motion of the capture entity's avatar 116 in the simulated virtual environment 118 can be driven based on the motion of the capture entity 106 in the capture volume 102 that is captured using the motion capture device 104.

In one embodiment, the simulated virtual environment 118 can contain a custom designed virtual universe that includes any objects (e.g., props, scenery, etc.) required by the events or situations being simulated. For example, the virtual universe can represent a village, an urban city, a jungle, etc including the appropriate objects such as huts, trees, etc. The virtual universe can provide a context in which the avatars 116a-n can exist and interact.

In one embodiment, a motion capture device 104 in the capture volume 102 can capture the movement and/or actions of the capture entity 106 (hereinafter "motion data"). In one embodiment, the motion data can be a motion attribute of the capture entity 106. In one embodiment, when the capture entity 106 is a participant, the motion data can include, inter alia, a position, an orientation and/or a velocity of movement of the participant's head. When the capture entity 106 is an ammunition and/or a model of the ammunition, the motion attribute can include inter alia, a position, an orientation and/or a velocity of movement of the ammunition and/or a model of the ammunition. In one embodiment, the motion data can include a position of the participant's head, an orientation of the participant's head, a velocity of movement of the participant's head, a position of the object associated with the participant (e.g., gun), an orientation of the object associated with the participant (e.g., gun), and/or a velocity of movement of the object associated with the participant (e.g., gun).

The motion capture device 104 can transmit the motion data to a simulator engine 402 (shown in FIG. 2). The motion data of the capture entity 106, along with other capture entity-specific information such as sound and physiological data, can be used by the simulator engine to control the behaviors and/or interactions between objects and avatars in the simulated virtual environment 118. The simulator engine 402 can manage the immersion of the capture entity 106 into the virtual environment by providing visual, auditory, tactile, and/or olfactory feedback to the capture entity 106 in near real time. The simulator engine 402 is described in greater detail below, in association with FIG. 4.

In one embodiment, the visual feedback can be provided to an HMD 112 worn by the capture entity 106. The visual feedback can drive a 1st person stereoscopic point of view (POV) display provided for the capture entity 106 via an HMD 112. The audio feedback can be managed by providing a surround-sound effect through individual headphones and/or a general multi-speaker sound system. Tactile and olfactory feedback can be provided through devices associated with the capture entity 106. The feedback loop created by the capture entity's interaction with the data processed by and/or emanating from the simulator engine provides an immediate and tactile experience drawing the capture entity 106 into a feeling that the experience is real (e.g., sensory immersive experience).

In one embodiment, the motion capture simulation system 100 includes a capture volume 102. In one embodiment, the capture volume 102 can be a large room and/or any appropriate volume of space that is monitored by the motion capture device 104 of the capture and simulation unit 202. In one embodiment, the capture volume 102 may include one or more motion capture devices to provide a three-dimensional ("3D") image and/or recording of the capture volume 102 that includes the capture entity 106. The one or more motion capture devices 104a-n can be distributed in the capture volume 102 in such a way that it can scan the entire volume of space represented by the capture volume 102. The one or more motion capture devices can three dimensionally capture the volume of space represented by the capture volume. In one embodiment, the capture volume 102 can accommodate a number of capture entities 106a-n. In one embodiment, the number of capture entities 106a-n can participate together in a simulated scenario in the simulated virtual environment 118 through each capture entity's avatar. In one embodiment, the position and orientation of the capture entity's avatar relative to another capture entity's avatar in the simulated virtual environment 118 can correspond to the position and orientation of the capture entity relative to the other capture entity in the capture volume 102. For example, if capture entity A is to the left of capture entity B in the capture volume, then the position and orientation of capture entity A's avatar is to the left of capture entity B's avatar in the simulated virtual environment. In another embodiment, the position and orientation of the capture entity's avatar relative to another capture entity's avatar in the simulated virtual environment 118 can be offset by a predefined value compared to the position and orientation of the capture entity relative to the other capture entity in the capture volume 102. For example, if capture entity A is to the left of capture entity B in the capture volume, then in the simulated virtual environment, capture entity A's avatar is to the right of capture entity B's avatar. In another example, capture entity A's avatar is on a hill and capture entity B's avatar is at ground level.

In one embodiment, an operation 1 (see reference number "1" in FIG. 1) illustrates a capture entity 106 preparing to participate in a simulation. In one embodiment, to participate in such a simulation, a capture entity 106 such as a participant (e.g., living being) can don a wearable computing device 114. The peripherals of the wearable computing device 114 can include, but are not limited to the HMD 112, a microphone, a set of headphones and/or a computing device capable of transmitting, receiving and/or processing data. Further, the participant (e.g., living being) can be outfitted with a wearable gear (e.g., clothing, equipment, etc). In one embodiment, the wearable gear may be attached with retro reflective markers 110 and/or other items required by the motion capture simulation system 100 for tracking the participant's movement. In one embodiment, if the capture entity 106 includes equipment associated with the participant and/or any other object, the markers 110 can be attached directly to the equipment and/or object.

In one embodiment, after suiting up, the participant can be registered as a capture entity 106 with the simulator engine. In another embodiment, the equipment associated with the participant can be registered as a capture entity 102. In one embodiment, any object in the capture volume can be registered as a capture entity 106. (See the operation denoted by reference number "2" in FIG. 1.) The operation of registering as a capture entity 106 can include creating an avatar of the capture entity 106 in the simulated virtual environment 118. Further registering as a capture entity 106 can include establishing an association between the capture entity's wearable computing device 114 and the capture entity's avatar 116.

After being registered, the capture entity 106 is now free to join other capture entities 106a-n in the simulated scenario. While in the capture volume, the motion capture simulation system 100 can determine the position and actions (e.g., motion data) of the capture entities 106a-n. (See the operation denoted by reference number "3" in FIG. 1.) Using the motion data, the simulator engine 402 can integrate the capture entity 106 into the simulated virtual environment 118 by driving the behavior of the capture entity's avatar in the simulated virtual environment 118 using the captured behavior (e.g., motion data) of the capture entity 106. Further, the capture entity avatar's view of the simulated virtual environment can be nearly simultaneously displayed in the capture entity's head-mounted display. The capture entity 106 can explore the simulated virtual environment and/or participate in the simulated events in the simulation scenario. In one embodiment, upon completion of the simulation scenario, the simulation can be optionally replayed for training or other purposes, as illustrated by operation 4 of FIG. 1. The sensory immersive motion capture simulation system is described in greater detail below, in association with FIG. 2.

Referring now to FIG. 1 and FIG. 2, FIG. 2 illustrates a block diagram of the motion capture simulation system of FIG. 1, according to one or more embodiments. In particular, FIG. 2 illustrates a preparation and review unit 204 and/or a capture and simulation unit 202.

In one embodiment, the capture and simulation unit 202 can be used to capture the movements and/or actions of the capture entity 106. In one embodiment, using the motion capture device 104 of the capture and simulation unit 202, the movements and actions of the capture entity 106 can be captured through taking images of the capture volume 102 that includes the capture entity. In another embodiment, the movement and actions of the capture entity 106 can be captured through continuously recording the capture volume 102 that includes the capture entity 106. Using the captured images/recording, the capture and simulation unit 202 can determine 3D motion data (e.g., position, orientation, velocity, etc.) of the capture entity 106 in the capture volume 102. The capture and simulation unit 202, can translate the 3D motion data of the capture entity 106 to a 3D motion data of the capture entity's avatar in the simulated virtual environment 118. In one embodiment, the capture and simulation unit 202 can drive the movements and actions of the capture entity's avatar 116 in the simulated virtual environment 118 based on the captured movements and actions of the capture entity 106 in the capture volume.

In one embodiment, the capture and simulation unit 202 can be used to generate a virtual character in the simulated virtual environment 118. Further, the capture and simulation unit 202 can be used to drive interactions between objects and avatars and/or avatars and virtual characters in the simulated virtual environment 118. In one embodiment, the capture and simulation unit 202 can drive the progression of events in the simulated virtual environment 118 based on the 3D motion data (e.g., position, orientation, velocity, etc.) of the capture entity 106. In one embodiment, the capture and simulation unit 202 can provide a visual, auditory, tactile, and/or olfactory feedback to the participant (e.g., capture entity 106) in near real time. The visual, auditory, tactile, and/or olfactory feedback can provide a sensory immersion experience to the participant (e.g., capture entity 106).

In one embodiment, the preparation and review unit 204 can be used to prepare a simulation environment. Preparing the simulation environment can include personalizing a capture entity 106. Personalizing a capture entity 106 can include matching the capture entity's avatar 116 with the physical attributes of the capture entity 106, such as matching the height of the avatar with that of the participant. Another example includes matching a shape of virtual representation of a weapon (e.g., avatar of weapon) with that of a weapon in the capture volume that is being motion captured. In addition, personalizing the capture entity 106 can include registering the capture entity 106 with the motion capture simulator engine 402. Further, preparing the simulation environment can include loading a virtual environment (e.g., virtual world) based on the requirement of the simulation. In one embodiment, a simulation scenario can be recorded live as the simulation is occurring using the preparation and review unit 204. In another embodiment, using the preparation and review unit 204, the simulation scenario can be stored once the simulation is over. For example, a simulation scenario could be a training scenario where the participants perform combat training in a simulated village environment. The simulation scenario can be stored after the participants finish the combat training or it can be stored as the combat training progresses. In one embodiment, the preparation and review unit 204 can facilitate a user replaying a stored (e.g., recorded) simulation scenario. In one embodiment, the stored simulation scenario may be replayed for training and/or other purposes.

In one embodiment, the capture and simulation unit 202 can be communicatively coupled to the preparation and review unit 204. In one embodiment, the capture and simulation unit 202 can communicate with the preparation and review unit 204 to load a virtual environment (e.g., virtual world such as jungle, urban city, etc.) that may be appropriate for a simulation. In another embodiment, the capture and simulation unit 202 can communicate with the preparation and review unit 204 to receive information including a list of the capture entities that have been registered with the motion capture simulation system 100. In a further embodiment, the capture and simulation unit 202 can communicate with the preparation and review unit 204 to store a simulation scenario for post simulation replay. In one embodiment, the capture and simulation unit 202 can transmit a 3D motion data (e.g., position, orientation, velocity, etc.) of the capture entity 106 to the preparation and review unit 204 for purposes of registration and/or personalization of the capture entity 106. The capture and simulation unit 202 and the preparation and review unit 204 are described in greater detail below, in association with FIG. 3 and FIG. 4.

Now referring to FIG. 2 and FIG. 3, FIG. 3 illustrates a block diagram of the preparation and review unit of FIG. 2, according to one or more embodiments. In particular, FIG. 3 illustrates a initialization unit 302, a scenario processing unit 304, a post simulation review unit 306 and a database 308.

In one embodiment, the initialization unit 302 can include a data processing device such as a computer. In one embodiment, the data processing device can be a multi core processor device. In another embodiment, the data processing device can be combination of multiple single-core or multicore processor devices communicatively connected via a network. Further, the initialization unit 302 can include an image capture device. In one embodiment, the initialization unit 302 can use the motion capture device 104 (shown in FIG. 4) of the capture and simulation unit 202 for purposes of capturing an image of the capture entity 106 (e.g., participant and/or an equipment associated with the participant). In one embodiment, the image of the capture entity 106 can be used for personalizing the capture entity 106. In one embodiment, personalizing the capture entity 106 can include matching a physical dimension of the capture entity 106 (e.g., participant) to the capture entity's avatar 116 in the simulated virtual environment 118. Further, personalizing a capture entity 106 (e.g., participant) can include associating a wearable computing device 114 to the capture entity 106.

In one embodiment, the initialization unit 302 can be at a remote location from the capture volume 102. For example, the operations of the initialization unit 302 are realized in a room that is separate from the capture volume 102. In another embodiment, the operations of the initialization unit 302 can be realized within the capture volume 102 such as when the initialization unit 302 uses the motion capture device 104 to capture an image of the capture entity 106.

In one embodiment, a participant (e.g., living being) dons a wearable gear and/or a wearable computing device 114. In one embodiment, the wearable computing device 114 can be a part of the wearable gear or vice versa. The wearable gear may include, inter alia a vest, an HMD, a microphone, and/or an earphone. In one embodiment, the wearable gear may be attached with retro reflective markers 110 to track the capture entity 106. In the case of an equipment, the markers 110 can be attached directly to the equipment associated with the participant. In one embodiment, the markers on wearable gear can be used to track movement and action of any portion of the participant, such as head, body and/or legs. In one embodiment, the wearable gear may be a single wearable component that can be worn as one unit. In another embodiment, the wearable gear may be a combination of wearable components that can be worn separately.

In one embodiment, the initialization unit 302 can begin personalizing the participant (e.g., capture entity 106) with associating the participant (wearing the wearable gear and/or the wearable computing device 114) with an avatar having the physical dimensions of an average sized human being. The physical dimensions of the average size human being can be predefined. Once the participant (e.g., capture entity 106) is associated with the avatar, an image of the participant (e.g., capture entity 106) can be captured using an image capture device of the initialization unit 302. Using the data processing device, the initialization unit 302 can determine the marker positions of the wearable gear from the captured image of the participant (e.g., capture entity 106). The initialization unit 302 can process the marker positions using the data processing device to determine the actual physical dimensions of the participant (e.g., capture entity 106). In one embodiment, the initialization unit 302 can scale the dimensions of the avatar to match the actual physical dimensions of the participant (e.g., capture entity 106). Once the avatar is scaled, the initialization unit 302 can register the avatar as the participant's (e.g., capture entity 106) avatar 116. In one embodiment, the initialization unit 302 can register the participant (e.g., capture entity 106) as a capture entity 106, whereby when the participant (e.g., capture entity 106) enters the capture volume, the participant (e.g., capture entity 106) may be identified as the capture entity 106 by the motion capture simulation system 100. In one embodiment, the initialization unit 302 can associate the wearable computing device 114 of the participant to the participant (e.g., capture entity 106) and/or the participant's avatar. The initialization unit 302 can store the associations between the (e.g., capture entity 106) and the wearable computing device and/or the registration information in the database 308. In one embodiment, the initialization unit 302 can communicate the scaling information of the avatar and the registration of the participant (e.g., capture entity 106) and/or the participant's avatar 116 to the capture and simulation unit 202 for assisting with the operations of the capture and simulation unit 202.

In one embodiment, the scenario processing unit 304 can facilitate an operator (not shown in Figure) loading a virtual world based on a request from the capture and simulation unit 202. Further, the scenario processing unit 304 can be configured to import a virtual world (environment) from an online source. The scenario processing unit can include a data processing device capable of connecting to the Internet. The scenario processing unit 304 can store the imported scenarios in the database 308. In one embodiment, the capture and simulation unit 202 can access the virtual world directly from the database 308. In another embodiment, the scenario processing unit 304 can retrieve the virtual world and communicate it to the capture and simulation unit 202. In one embodiment, the scenario processing unit 304 can support an operator editing appropriate features of the virtual world. The operator can add, remove or modify elements of the virtual world. In one embodiment, the scenario creation unit 304 can be configured to generate a number of virtual characters automatically. In another embodiment, using the scenario creation unit 304, an operator can create virtual characters. In one embodiment, an operator may create a virtual world using the scenario processing unit 304. The scenario processing unit 304 can include a user interface through which the operator can interact with the scenario processing unit 304.

In one embodiment, the post simulation review unit 306 can include a data processing device such as computer, a display device and/or and audio output device. In one embodiment, the capture and simulation unit 202 can store the recorded simulation scenario in the database 308. Using the post simulation review unit 306, a user can load a recorded simulation scenario from the database 308. The operator can further play the recorded simulation scenario for training and/or other purposes. The capture and simulation unit 202 is described in greater detail below, in association with FIG. 4.

Now referring to FIG. 2 and FIG. 4, FIG. 4 illustrates a block diagram of the capture and simulation unit of FIG. 2, according to one or more embodiments. In particular, FIG. 4 illustrates a tracking device 408, a simulator engine 402, a motion capture device 104, a wearable computing device 114, and/or a viewer device 410.

In one embodiment, the motion capture device 104 can be or comprise a high speed camera. The motion capture device 104 can include a processor to process an image captured using the motion capture device 104. In one embodiment, the motion capture simulation system 100 can use one or more motion capture devices to capture information about the locations of the markers (or the location of the subject in a markerless embodiment) as the capture entity moves. The motion capture device 104 can support high-speed image capture, as well as high-speed image processing. Each motion capture device 104 of the one or more motion capture devices may be connected to each other, as well as to a tracking device 408.

In an example embodiment, the one or more motion capture devices 104 are placed around the capture volume 102. The one or more motion capture devices 104 can be synchronized so that their exposures occur simultaneously. In one embodiment, the motion capture devices 104 can be synchronized by an external source. In another embodiment, the motion capture devices 104 can be synchronized based on an internal clock within each motion capture device 104. In an example embodiment, each motion capture device 104 may include an number of light emitters such as LEDs along the periphery of each of the motion capture device 104. During motion capture, the LEDs may be turned on. The light from the LEDs may be reflected back from the retro reflective markers 110 attached to the wearable gear donned by the capture entity 106 and/or the retro reflective markers 110 attached to the equipment (e.g., weapon) associated with the capture entity 106. The captured image may include locations where the reflected LED light rays may have intersected the image sensor. The locations where the reflected LED light ray may have intersected the image sensor, as well as other characteristics are used to determine the locations of the markers.

Each motion capture device 104 determines coordinates for each marker that it sees. As the subject moves, the motion capture devices 104 capture the motion and provide marker data, which describes the location of the markers in the 3D space. In one embodiment, the motion capture device 104 may be configured to process the captured image. Processing the captured image can include subtracting a background image from the captured image. A background image may represent in the capture volume 102 and is calculated for each motion capture device 104 of the plurality of motion capture devices. The background image can include items that will be present throughout the motion capture, such as the other motion capture devices and lights, and excludes the capture entity 106 and any other objects that will be the subject of the motion capture. Once the background image is determined, the background image can be used to determine a threshold image.

Further, processing the captured image can include comparing a captured image to the threshold image on a pixel-by-pixel basis to locate hot pixels. A hot pixel may be a pixel in the captured image that has an intensity greater than the corresponding pixel in the threshold image. Once the hot pixels are located, the pixels can be analyzed to locate connected hot pixels (segments) and connected segments (globs). If the characteristics of the globs satisfy the characteristics of the markers (or the subject in a markerless capture), then the globs are selected for further analysis to the tracking device 408. In one embodiment, the motion capture device 104 transmits the processed image to the tracking device 408.

In one embodiment, the tracking device 408 can receive the processed image including the segments and globs located by the motion capture device 104. The tracking device can determine the 3D motion data (e.g., position, orientation, velocity, etc.) for the candidate points corresponding to the selected globs. The tracking device 408 can use the 3D motion data (e.g., position, orientation, velocity, etc.) of the candidate points to track the positions of the candidate points between frames. The attributes for the candidate points can be compared to the expected attributes of the capture entity's motion. If there is a correlation, then the candidate points are used to determine the capture entity's motion. In one embodiment, the expected attributes of the capture entity 106 can be recorded and stored during the initialization process described in association with FIG. 3.

In one embodiment, the tracking device 408 can send the 3D motion data (e.g., position, orientation, velocity, etc.) of the capture entity 106 to the simulator engine 402.

In another embodiment, the tracking device 408 can send the 3D motion data (e.g., position, orientation, velocity, etc.) of the capture entity 106 to the wearable computing device 114 of the capture entity 106. If there are a number of capture entities, then the tracking device 408 can select which capture entity's 3D motion data (e.g., position, orientation, velocity, etc.) is to be sent to the wearable computing device 114. For example, if a capture volume 102 includes capture entity A and capture entity B, then the tracking device 408 can choose to send the 3D motion data (e.g., position, orientation, velocity, etc.) of both capture entities A and B to the simulator engine 402. The 3D motion data (e.g., position, orientation, velocity, etc.) of capture entity A can be sent to the wearable computing device 114 of capture entity A. The 3D motion data (e.g., position, orientation, velocity, etc.) of capture entity B can be sent to the wearable computing device 114 of capture entity B. In one embodiment, the operations of the tracking device 408 can be performed by the motion capture device 104. In one embodiment, the 3D motion data may be determined by the motion capture device 104, and the motion capture device 104 may transmit the 3D motion data directly to the simulator engine 402. In another embodiment, the 3D motion data can be directly transmitted to the wearable computing device 114 from the motion capture device 104 and/or the tracking device 408.

In one embodiment, the simulator engine 402 can include a multi-core processor. In another embodiment, the simulator engine 402 can include a combination of multiple single core processors. In one embodiment, the simulator engine 402 can include a memory coupled to the processor. The memory may be non transitory storage medium, in one embodiment. The memory may include instructions. The processor may execute the instructions to perform operations that characterize the movements and actions of the capture entity 106 with high fidelity and nearly immediately and accurately translate the movements and actions of the capture entity 106 into corresponding movements and actions of the capture entity's avatar 116. In one embodiment, the simulator engine 402 can include one or more data processing devices such as computers mounted on a rack. The simulator engine 402 can include a user interface. An operator may access the simulator engine 402 through the user interface.

In one embodiment, the simulator engine 402 can receive the 3D motion data of the capture entity 106 from the tracking device 408. In another embodiment, the simulator engine 402 can receive the 3D motion data of the capture entity 106 from the motion capture device 104. In one embodiment, the simulator engine 402 can receive the 2D motion data of the capture entity 106 from the motion capture device 104. The simulator engine 402 can transform the 2D motion data from the motion capture device 104 to a 3D motion data of the capture entity 106. In one embodiment, the simulator engine 402 can receive a physiological data associated with the capture entity 106 from the wearable computing device 114 of the capture entity 106. The physiological data can comprise audio data, tactile data, heart rate data, blood pressure data, temperature data, olfactory data, EMG data, etc. In certain embodiments, such data supports monitoring trainee performance or trainee stress level.

Using the processor, the simulator engine 402 can also process the audio data, tactile data, and/or olfactory data associated with the capture entity 106 (e.g., participant) to generate a feedback data for the capture entity 106 (e.g., participant). Further, using the processor, the simulator engine 402 can process the 3D motion data of the capture entity 106 to drive the capture entity's avatar 116 in the simulated virtual environment 118. In addition, the simulator engine 402 can drive the interaction of the capture entity's avatar 116 with the virtual characters in the simulated virtual environment 118. The simulator engine 402 can also drive the interaction of the capture entity's avatar 116 with the objects in the simulated virtual environment 118. The simulator engine 402 can control the interaction and/or behavior of the virtual character based on an artificial intelligence logic algorithm.

In one embodiment, the interactions of the virtual character, the capture entity's avatar 116 and/or the objects in the simulated virtual environment 118 can create sensory effects such as an audio effect (e.g., sound of an character walking in the simulated environment, sound of a shooting a gun in the simulated environment, the sound of a capture entity's avatar talking in the simulated environment, sound of a virtual character hitting against a prop in the simulated environment, sound generated by a vehicle in the simulated environment, etc.), a visual effect (e.g., shadows of characters changing as they walk based on the position of the character in the simulated environment, bleeding responsive to getting shot at, etc.) and/or a physiological effect (e.g., vibrations, electrical stimulation, etc.) The simulator engine 402 can transmit the various sensory effects, as auditory data, visual data, tactile data and/or olfactory data, to the wearable computing device 114 of the capture entity 106.

In one embodiment, the simulator engine 402 can periodically update the 3D motion data (e.g., position, orientation, velocity, etc.) of the capture entity's avatar 116, the 3D motion data (e.g., position, orientation, velocity, etc.) of the virtual character and/or the objects in the simulated virtual environment. In an example embodiment, the simulated virtual environment 118 is updated based on a frame rate at which the simulation is played, such as 60 frames per second. The frame rate can be variable. In one embodiment, the simulator engine 402 can transmit the updated 3D motion data (e.g., position, orientation, velocity, etc.) of the capture entity's avatar 116, the 3D motion data (e.g., position, orientation, velocity, etc.) the virtual character and the objects in the simulated virtual environment 118 to the wearable computing device 114 of the capture entity 106. In one embodiment, the simulator engine 402 can transmit the updated data through individually sending the updated data to a specific wearable computing device 114 of the capture entity. In another embodiment, if there are one or more capture entities, the simulator engine 402 can transmit the updated data by broadcasting the updated data. The updated data can include the 3D motion data (e.g., position, orientation, velocity, etc.) of the capture entity's avatar 116, the 3D motion data (e.g., position, orientation, velocity, etc.) the virtual character, the 3D motion data (e.g., position, orientation, velocity, etc.) of objects in the simulated virtual environment 118 and/or a simulation scenario data to the wearable computing device 114. Further, the simulator engine 402 can transmit a audio data, a visual data, a tactile data and/or an olfactory data to the wearable computing device 114 of the capture entity 106. The simulator engine 402 can be communicatively coupled to the wearable computing device 114.

In one embodiment, the wearable computing device 114 can receive the updated data from the simulator engine 402. Further, the wearable computing device 114 of the capture entity 106 (e.g., participant) can receive the audio data, the visual data, the tactile data and/or the olfactory data from the simulator engine 402. The wearable computing device can customize the data to the perspective of the capture entity 106 (e.g., participant) associated with the wearable computing device 114.

In one embodiment, the visual data can be provided to an HMD 112 worn by the capture entity 106. The visual data can drive a 1st person stereoscopic POV display provided for the capture entity 106 via an HMD 112. The audio data can be managed by providing a surround-sound effect through individual headphones and/or a general multi-speaker sound system. Tactile and olfactory data can be provided through a respective devices associated with the capture entity 106. The wearable computing device 114 of the capture entity 106 (e.g., participant) can use the audio data, the visual data, the tactile data and/or the olfactory data to provide an immediate and tactile experience drawing the capture entity 106 into a belief that the experience is real (e.g., sensory immersive experience).

In one embodiment, the wearable computing device can include a microphone. The wearable computing device 114 can capture a sound (or speech) of capture entity 106 (e.g., participant) through a microphone coupled to the capture entity 106. Further, the wearable computing device 114 can sample the sound. In one embodiment, the wearable computing device 114 can transmit the sampled sound to the simulator engine 402. In some embodiments, the wearable computing device 114 can process the captured sound to recognize a speech. In one embodiment, the wearable computing device 114 can transmit the processed sound and/or the recognized speech to the simulator engine 402.

In one embodiment, the simulator engine can transmit a simulation scenario to a display device 410. The simulation scenario can include the simulated virtual environment 118, the updated 3D motion data of all the objects, the virtual character, the capture entity's avatar, the audio data, the visual data, the tactile data and/or the olfactory data. In one embodiment, the simulation scenario can be transmitted as a video data. The display device 410 can process the video data and/or the simulation scenario to display the simulation to an external user. The external user can view the simulation scenario as and when the simulation is in progress, such as when the capture entities are performing actions in the capture volume for the simulation. The display device 410 can include, inter alia a TV, a computer, a monitor, a LCD display, LED display and/or smart display. In one embodiment, the display device 410 can receive simulation scenario and/or the video data from the wearable computing device 114. In one embodiment, the display device 410 can display the simulation from different perspectives, such as from the perspective of a trainer and/or a participant. In one embodiment, the different perspectives may be displayed through a partitioned view over a single display interface such that an external user need not use multiple display devices to view the simulation from each perspective. In an alternate embodiment, the display device can include one or more display interfaces that are connected to each other.

Turning now to FIGS. 5-14, exemplary motion capture implements, including weapons embodiments, will be discussed in further detail. As illustrated in FIG. 1, the capture entity 106 can use utilize motion capture implements in the motion capture volume 102 under monitoring by one or more motion capture devices 104. Weapons embodiments can comprise firearms used in infantry training such as pistols, rifles, and heavy machineguns of various makes and models, for example. Additional embodiments of weapons can include, but are not limited to: knives, swords, pistols, rifles, bows, hand grenades, batons, shoulder fired rockets, turret/tripod mounted machineguns, and cannons, to mention a few more examples without attempting to be exhaustive. Such devices can be working, lethal, non-lethal partially disabled, inoperable models, mockups, facsimiles, and so forth.

An exemplary function of a sensory-immersion motion capture simulation system 100 is to provide a capability for reduced-risk training of individuals or groups in the performance of potentially dangerous tasks or operations in hostile or potentially threatening environments. Specifically, one category of dangerous tasks that benefits from training in a virtual environment is practicing proper technique for tasks that involve the use of firearms.

To facilitate successful firearm training in a simulated environment, each participant can be given a model of a firearm appropriate for the training at hand. The model can be modified in such a way that it can become inherently linked to its representation in the virtual reality environment. The model and its virtual representation in the motion captured simulation can be linked such that movement and action of the model is represented in the virtual world. For example, when a model weapon is held by participant A, other participants in the simulation system will see participant A holding the model in the same location and pose as participant A does physically. Consequently, participant A, as well as other participants, can perform training objectives with the model of the weapon as one would do with a real weapon.

A participant would wield the model of the weapon using the same technique as when wielding the real weapon. If the real weapon has a trigger switch (for example to fire a ballistic round), the weapon can give tactile feedback that it has fired and the communicate this event with the simulator. Such communication between the model and the simulator can be accomplished via optical communication using motion capture or radio communications with the simulator. This communication can have the result that the simulator generates an appropriate effect in the virtual world, as if a real weapon were fired. Type of weapon, position, aim, and type of round/missile can all be taken into account in order to generate the appropriate effect in the simulation.

Figure 5A:
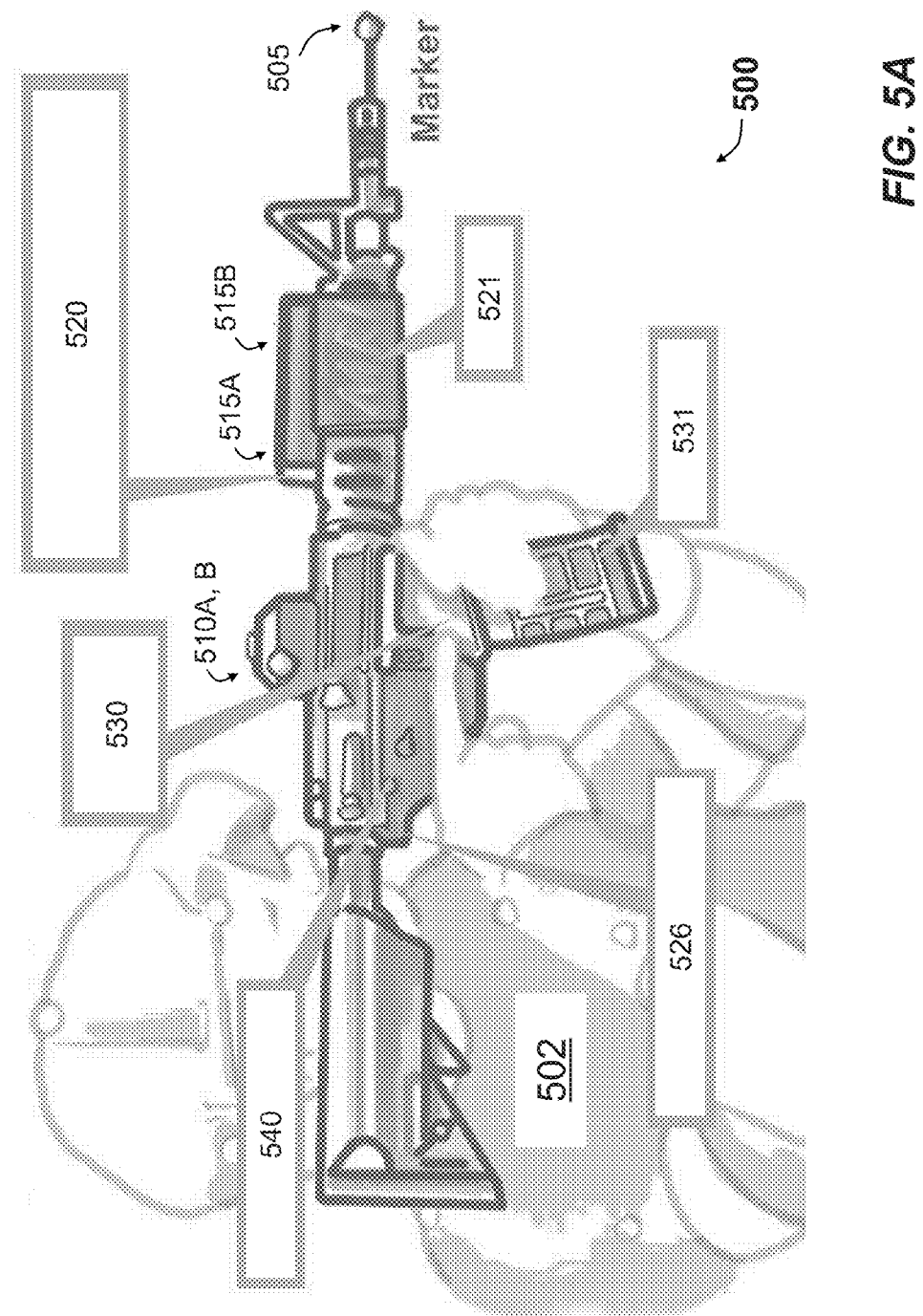
FIGS. 5A and 5B (collectively FIG. 5) are illustrations of a weapon, as an embodiment of a motion capture implement, associated with motion capture simulation according to certain exemplary embodiments of the present invention.
Figure 5B:
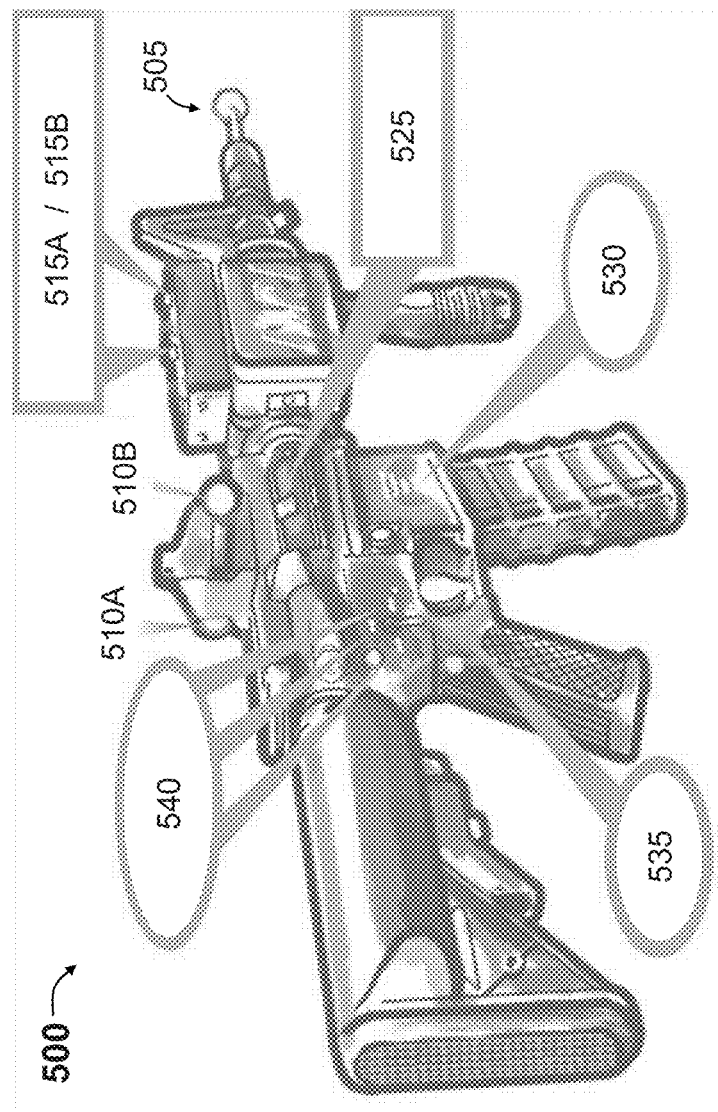

Referring now to FIG. 5, this figure illustrates a representative weapon 500, as an exemplary embodiment of a motion capture implement, associated with motion capture simulation in accordance certain embodiments of the present invention. The embodiment illustrated in FIGS. 5A and 5B in two views can be viewed as a motion capture version of an M4/AR-15 rifle. Many other common rifles can be readily supported, and the technology is readily scalable to larger or smaller weapons.

As will be discussed in further detail below, optical, electrical, or magnetic switches can be placed inside the weapon 500 to detect states of the various activators the participant 502 may manipulate, such as the trigger switch 535, magazine detector 530, configuration/selector switch 540 (e.g. safe/single shot/burst), and charging handle. The illustrated embodiment also provides tactile feedback in the form of simulated recoil when firing. Several methods to generate recoil can be incorporated in the weapon 500, ranging from linear motors or solenoids moving a mass or shaking the weapon 500, to compressed air being released into a chamber which then accomplishes a similar effect.

Communication between the weapon 500 and the motion capture simulation system 100 can be one-way (unidirectional) or two-way (bidirectional) and can present to the simulator information about the weapon 500, such as location and aim as well as operational state of the weapon 500, for example if the weapon 500 is firing or on safe.

Communication from the motion capture simulation system 100 to the weapon 500 facilitates the system taking control of the weapon 500 to add levels of difficulty to the training at hand. For instance, the system can virtually place a bad round in the magazine 531 so that the weapon 500 will not fire the round, requiring the participant 502 to eject the bad round manually before regaining weapon control. The weapon 500 may further be remotely jammed, for example as a result of being hit by a virtual round from the side in a critical location. Accordingly, remote instructions can override the weapon's own intelligent behavior. The weapon 500 can further be controlled by a programmable chip, so the weapon 500 can autonomously calculate error rate and jam randomly or at a preset rate or increase error rate based on preprogrammed conditions or trainee behavior. For example, the weapon 500 can self impose a simulated failure due to a high sustained rate of fire causing barrel overheating. As another example, high fire rate can cause permanent or statistically high weapon failure—until the training scenario finishes and the weapon 500 is reset.

In certain embodiments, the weapon 500 can comprise an actual weapon, modified in such a manner that shots fired are communicated to the simulator engine of the motion capture simulation system 100, for example through wireless or optical communication with the simulator. In such an embodiment, motion capture markers can been added as discussed in further detail below to facilitate tracking the weapon position and aim. Further modifications could be made to make the weapon 500 fire blanks or simulation rounds to promote safety. Such embodiments can comprise various ballistic weapons, ranging from pistol to heavy machineguns and cannons, for example.

In certain embodiments, the weapon 500 can be a modified "airsoft" M4 replica of a real M4 automatic machinegun as used by US and foreign military personnel. Starting out with an airsoft weapon replica, internal mechanisms of the airsoft unit can be removed and only the shell of the model is used. Retro-reflective markers 505, 510A, 510B are added for optical motion capture tracking. The internal mechanism of the airsoft unit can be replaced with a form-fitting holder that houses: various switches on a slave circuit board; one or more solenoids, linear motors or other tactile feedback generating devices, typically in-line with the barrel for tactile recoil simulation; and a cable connector leading signals to an internal master circuit board. The solenoid wires can be electrically attached to the slave circuit board. The master circuit board can house a programmable chip (such as the chip marketed by Microchip Technologies of Chandler, Ariz. under the trade identifier "PIC16F690" or a chip marketed by Freescale Semiconductor under the trade identifier "MC13224V") with multiple input/output lines. The input/output lines can be connected in such a fashion that switches on the slave circuit board can be read in by the programmable chip and the various outputs can be controlled by the programmable chip. The output lines can connect to a relay (or similar logic) to control the movement of the solenoid and to two or more lights that convert electrical energy to photonic energy for optical communication with the motion capture simulation system 100 as further discussed below. The master circuit board can be powered via rechargeable battery. Mechanical characteristics of the weapon 500 can match an actual, lethal fire arm, including mass, mass center, moments and products of inertia. Software on the programmable chip can control when and if the weapon 500 fires. When the weapon 500 is in a firing state, the solenoid can be activated cyclically as well as a blinking pattern of light emitted to signal to the motion capture device(s) 104 of the motion capture simulation system 100 that the weapon 500 has been fired by the participant 502.

Accordingly, FIG. 5 illustrates the weapon 500 in the form of an exemplary sketch-up of one possible configuration of a simulated M4 rifle. In the illustrated embodiment, software executing on one or more microprocessors can receive input from various switches and/or sensors on the weapon 500. The illustrated embodiment of the weapon 500 can accomplish both wireless radio communication as well as optical communication via motion capture.

The illustrated embodiment comprises three passive markers 505, 510A and 510B, each of which can be implemented as a spherical ball covered in retro-reflective tape. The three markers 505, 510A and 510B are located externally on the body of the weapon 500 to aid in optical tracking, while the weapon 500 is autonomously interacting with the participant 502 (and reacting to participant inputs such as trigger pulls and reloads), such as firing rounds and generating recoil at the appropriate time.

Fourth and fifth markers 515A and 515B (collectively marker 515) are active markers and can be implemented by placement of two light emitting diodes, which can be spaced about two inches apart on the weapon 500, or some other appropriate distance resolvable by motion capture device(s) 104. (Marker 515B will be referred to as front LED 515B, and LED 515A as rear LED 515A as appropriate below, without limitation.) When a round is fired the firing event is communicated to the motion capture simulation system 100 via the two LEDs 515B and 515A on the top of the rifle.

The state of the weapon 500 can be communicated by turning these LEDs 515A and 515B on or off in a predetermined pattern recognized by the motion capture simulation system 100. As will be discussed in further detail below with reference to FIG. 7, the transition of A-on/B-off to A-off/B-on can signify a participant 502 firing a round from the weapon 500. Cycling back from A-off/B-on to A-on/B-off can indicate 'ready to fire'. Using a pattern different from A-off/B-on or A-on/B-off (e.g. A-on/B-on) could signify the weapon is on 'safe', or A-off/B-off could indicate 'empty' or 'magazine ejected' states, for example. Additional active tracking markers (in the form of LEDs) can be placed on the weapon 500 in order to increase the number of states that can be communicated via optical motion capture. Additionally, a single LED (515A or 515B for example) can be pulsed to identify the weapon 500, a specific participant 502 associated with the weapon 500, or an operational state or state change of the weapon 500.

In certain embodiments, the weapon 500 is untethered (e.g. without power or air hoses connected) to remain true-to-life. One or more rechargeable batteries 521 can provide portable power for on-board electronics as well as the recoil mechanism 526 and associated recoil generator unit 525. The recoil mechanism 526 can be activated when normal conditions are met and the participant 502 pulls the trigger (weapon not on safe, charged and magazine present etc.). The recoil mechanism 526 can comprise a solenoid, linear motor or other appropriate electrically driven device or be a pneumatic or hydraulic cylinder that moves in such a manner that the participant 502 perceives a bullet being fired. For pneumatic or hydraulic recoil, the activating mechanism can be an electrically activated valve, for example via the on-board electronics coupled to a trigger switch 535. Alternatively, pneumatic or hydraulic recoil can be operated via a mechanical system, with the electronics merely detecting activation of the mechanism. As illustrated, the recoil generator unit 525 can be embedded inside the weapon 500. While it could be positioned at several locations, the illustrated embodiment places it inside the upper receiver, but could alternatively be placed in the stock or inside the forward hand guard. Keeping the recoil unit in-line with the barrel can facilitate generating authentic feeling recoil action. In either case, operational parameters can be transmitted wirelessly via either optical or radio transmission.

In certain embodiments, the module 520 that drives the front and rear LEDs 515B and 515A also comprises a wireless radio for transmitting data (from the weapon 500 via radio frequency signal). Such data can report various operational states of the weapon 500, for example position of the configuration switch 540 (setting safety, burst mode, single fire, fully automatic, etc.); rounds fired; rounds remaining in magazine 531; presence of magazine 531 as sensed by the magazine detector 530, or other appropriate information. Radio communication between the weapon 500 and motion capture system can further be used to enhance training by remotely causing the weapon 500 to malfunction or limit the number of rounds in the magazine 530. In certain embodiments, specialty systems can use wireless, radio frequency communication for the participant 502 dialing in a different level of scope magnification, switching between scope day and night vision modes, or turning on laser aiming capability, to mention a few representative examples without limitation.

To further enhance the motion capture experience, orientation, acceleration, or a variety of other sensors can be included on the weapon 500 and sensed parameters reported wirelessly, either via radio frequency link or optically. For example, radio frequency communication can serve as a backup to optical tracking in instances where optical markers 505, 510A, 510B, 515A, 515B are obscured.

Figure 6:
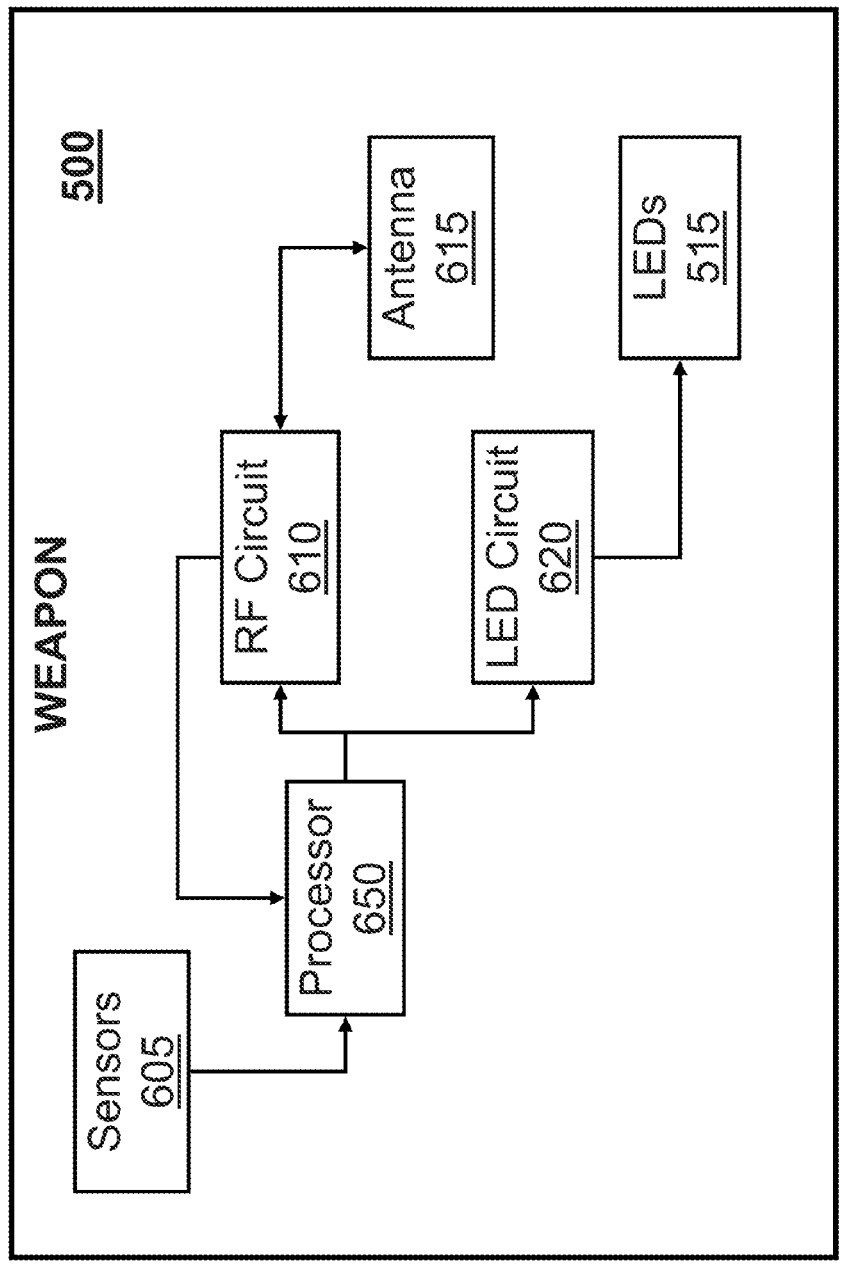
FIG. 6 is an illustration of a functional block diagram of a weapon, as an embodiment of a motion capture implement, associated with motion capture simulation according to certain exemplary embodiments of the present invention.

Turning now to FIG. 6, this figure illustrates a representative functional block diagram of a representative weapon 500, as an exemplary embodiment of a motion capture implement, associated with motion capture simulation according in accordance certain embodiments of the present invention. FIG. 6 can describe the weapon 500 of FIG. 5 and will be discussed in such an exemplary context via referencing certain elements of FIG. 5 and other figures, without limitation.

Sensors 605 can comprise switches or detectors, such as the magazine detector 530, the trigger switch 535, the configuration switch 540 and/or other elements that can determine or identify an operational state of the weapon 500. The sensors 605 feed information to a processor 650, which can be a microprocessor as discussed above with associated volatile and non-volatile memory, or other system capable of executing instructions or implementing a static or dynamic process. Accordingly, the processor 650 can implement decision-based processing utilizing software. When appropriate conditions are present as reflected from sensor input, the processor 650 can communicate using the radio frequency ("RF") circuit and associated antenna 615 and/or the LED circuit 620 and associated LEDs 515.

In certain embodiments, the processor 650 utilizes WiFi communications or IEEE 802.15.4 communications through the RF circuit 610 and antenna 615 for sending and/or receiving information deemed not to be time critical, while using the LED circuit 620 and associated LEDs 515 for time-critical information transmission, such as shooting. Transmitting trigger pulls via presenting information optically for camera capture can reduce latency as compared to using radio transmission for such events. Reducing latency or unexpected delays for shooting can be useful when the aim of the weapon 500 is often changing during and immediately following weapon firing on a moving target. Reducing delay promotes realism and enhances level of immersion.

Turning now to FIG. 7, this figure illustrates a representative table 700 of exemplary active marker states for conveying operational states of a motion capture implement associated with motion capture simulation in accordance certain embodiments of the present invention. The table 700 can apply to the weapon 500 illustrated in FIG. 5 and discussed above, and will be discussed in such an exemplary context, without limitation.

As discussed above, the weapon 500 comprises a rear LED 515A and a front LED 515B. An overhead camera (e.g. of a motion capture device 104) can differentiate the rear LED 515A and the front LED 515B from one another based on relative positions of one or more of the markers 510A, 510B, and 505. In one exemplary embodiment, the markers 510A, 510B, and 505 are arranged in a triangle of known proportions, and the LEDs 515A and 515B are distinguished and identified in a captured image relative to one another based on location within that triangle. In exemplary embodiments, LED locations can be anywhere on a weapon 500.

When the participant 502 has placed the weapon 500 in a state in which firing is enabled, e.g. via turning the weapon safety off, the front LED 515B is off (electricity is off and the LED 515B is not emitting light) and the rear LED 515A is on (electricity is on and the LED 515A is emitting light).

In the illustrated exemplary embodiment, when the participant 502 fires the weapon 500, the front LED 515B pulses on for 45 milliseconds (ms) while the rear LED 515A remains off. In this firing state 720, as discussed below with reference to FIG. 8, the pulse has sufficient duration to facilitate camera capture. Different rates of fire or different frame rate of motion capture can result in different pulse durations.

When the participant 502 turns the weapon safety on (disabling firing of the weapon 500), the front LED 515B is off and the rear LED 515A is off; thus neither is emitting light.

Both LEDs 515A and 515B can be turned on (so they are simultaneously emitting light) to indicate another operational state for camera capture.

Accordingly, the spatial pattern of light emitted by the LEDs 515A and 515B provides information about operational state of the weapon 500 and can further identify position, orientation, or other information about the weapon 500 or the associated participant 502 using it.

While the illustrated embodiment has two LEDs 515A and 515B, other embodiments may have a single LED or three or more LEDs. In certain embodiments, more LEDs can provide an increase in the amount of information that can be sent from the weapon 500 via modulating the spatial pattern of emitted light.

In certain embodiments, the motion capture system can query each radio module. Each radio module can answer the query by blinking an LED pattern. The response provides the motion capture system with positional data from which the system can associate a radio signal or motion capture implement with a particular location within the motion capture volume.

Additionally, one of more LEDs can be pulsed in a predetermined sequence to convey information. For example, each of multiple motion capture implements may have a unique code that is pulsed in order to identify which motion capture implements are being utilized throughout a training exercise, and to associate with various participants. In this manner, participants may exchange firearms (or other weapons) and the motion capture simulation system 100 can keep track of which participants are utilizing which weapons. For example, a participant whose weapon has jammed might retrieve a weapon from another participant who has been deemed killed, and the training system can track subsequent weapons usage in the simulation.

Turning now to FIG. 8, this figure illustrates representative signal traces 825 and 850 respectively describing exemplary active marker activation times and exemplary camera acquisition times for conveying operational states of a motion capture implement associated with motion capture simulation in accordance certain embodiments of the present invention. More specifically, FIG. 8 illustrates the firing state 720 described in FIG. 7 as discussed above.

As illustrated, the front LED 515B remains on for at least two camera frame captures regardless of when the front LED 515B turned on in the recurring series of frame captures. In the illustrated exemplary embodiment, the LED 515B pulsed on for 45 ms, while the camera acquisition frequency was 60 times per second (period of 16.7 ms) with a exposure time of 0.5 ms.

Turning now to FIG. 9, this figure illustrates a representative flowchart of an exemplary process 900 in which active markers convey operational state information about a motion capture implement associated with motion capture simulation in accordance certain embodiments of the present invention.

Process 900, and other processes disclosed herein, may comprise or involve computer programs, computer-implemented steps, and/or software. Accordingly, certain exemplary embodiments the present invention can include one or more computer programs embodying certain functions described herein and illustrated in the examples, diagrams, and appended flowcharts. However, it should be apparent that there could be many different ways of implementing aspects of the present invention in computer programming, and the invention should not be construed as limited to any one set of computer program instructions. Further, a skilled programmer would be able to write such computer programs without difficulty based on the exemplary functional block diagrams, flowcharts, and associated description in the application text, for example.

Therefore, disclosure of a particular set of program code instructions is not considered necessary for an adequate understanding of how to make and use the present invention.

The inventive functionality of any programming aspects of the present invention will be explained in more detail in the following description in conjunction with the remaining figures illustrating functions and program flow and processes.

Certain steps in process 900 as well as in other processes described herein may naturally precede others for the technology to function as taught. However, the present invention is not limited to the order of the steps described if such order or sequence does not alter the functionality of the present technology to the level of rendering the present invention inoperative or nonsensical. That is, it is recognized that some steps may be performed before or after other steps or in parallel with other steps without departing from the scope and spirit of the present invention.

The following discussion of process 900, which is entitled "Weapons Communication," will refer to certain elements illustrated in FIGS. 1, 2, 3, 4, 5A, 5B, 6, 7, and 8. However, those of skill in the art having benefit of this disclosure will appreciate that various embodiments of process 900 can function with and/or accommodate a wide range of devices, systems, and hardware (including elements illustrated in other figures as well as elements not expressly illustrated) and can function in a wide range of applications and situations. Accordingly, such referenced elements are exemplary, are provided without being exhaustive and without limitation, and are among many others supported by the present invention.

At step 905 of process 900, motion capture begins, in this example a training exercise comprising motion capture simulation. Each participant 502 is provided a respective weapon 500. For example, a dozen participants 502 may each pick up a weapon 500 from a bin without having a specific weapon assigned to any specific participant 502. The participants 502 stand in designated locations of the floor of the motion capture volume 102 while holding their weapons 500. For example, the floor may have a grid of spaces marked off, with each participant 502 standing in a respective one of the spaces. Organizing the participants 502 in known spatial locations facilitates associating each participant 502 with a particular weapon 500 in step 910 as discussed below.

At step 910, the motion capture simulation system 100 sends a radio frequency signal to each of the weapons 500 carrying an instruction to initiate a unique light pattern, such as a series of pulses. Thus, each weapon 500 outputs a respective code optically. Each weapon 500 can output a time-sequence of weapon-identifying pulses, for example. In certain embodiments, the weapons 500 are prompted in turn. In other exemplary embodiments, two or more weapons 500 concurrently output identifying pulse codes.

At step 915, the motion capture simulation system 100 captures the emitted codes, typically via an image obtained on a charge coupled device ("CCD"), CMOS sensor, or other appropriate detector of a camera in a motion capture device 104. Since the participants 502 are in known locations, the motion capture simulation system 100 readily associates each participant 502 with the weapon 500 that participant 502 is holding. According, the motion capture simulation system 100 determines who is holding what weapon 500, associating a radio module signature with a physical object. The signature could be a radio identifier, such as an assigned number or MAC address of the radio module.

At step 920, the simulation runs and the participants 502 undergo weapons training. The participants 502 enter a computer-generated combat field and exchange fire with computer-generated enemies, with other participants 502 (force-on-force), or just observe and walk through, for example At inquiry step 925, the motion capture simulation system 100 determines whether any anomalies are detected. An exemplary anomaly could be an inability to locate or account for one of the weapons 500 that were identified at step 910, for example. If no anomaly is detected, then process 900 iterates step 920 and the simulation continues. If on the other hand, an anomaly is detected, then process 900 loops back to step 910 and one or more weapons 500 is prompted to output an identifying sequence of light pulses. All weapons 500 may be prompted. Alternatively, when the anomaly is weapon specific, the weapon 500 or weapons 500 in question can be prompted. In this manner, the motion capture simulation system 100 can refresh weapons identification and address anomalies. For example, if a participant 502 lays down one weapon 500 and picks up another weapon 500 (which may or may not be of the same weapon type), then the motion capture simulation system 100 can monitor that participant's usage of the picked-up weapon 500 while process 900 continues to iterate appropriate steps.

Turning now to FIG. 10A, this figure illustrates a representative weapon 1000, specifically a semiautomatic handgun as an exemplary embodiment of a motion capture implement, associated with motion capture simulation in accordance certain embodiments of the present invention. See also FIG. 10B that illustrates an alternative embodiment. The illustrated embodiment can comprise a modified airsoft pistol of various makes as used by military and law enforcement agencies (for example per models available from Glock, Beretta, and Sig-Sauer). Besides airsoft pistols, real pistols modified to shoot blanks or some other form of training rounds can readily be utilized for the illustrated weapon 1000.

In the illustrated embodiment, three passive tracking markers 1005, 1010, and 1015 are attached to the weapon 1000. In the illustrated positions, the markers 1005, 1010, and 1015 are respectively attached to the barrel, slide and body of the weapon 1000 in such a manner that they are readily tracked by an optical camera of the motion capture devices 104, but avoid substantially interfering with handling of the weapon.

In one exemplary embodiment, only the passive tracking markers 1005, 1010, and 1015 are used. In such an embodiment with solely passive tracking markers, one or more markers 1015 are situated on the slide mechanism 1030 and one or more markers 1005, 1010 are located on the body or barrel of the weapon 1000. As will be discussed in further detail below with reference to FIG. 11, the motion capture simulation system 100 tracks all markers 1005, 1010, and 1015 on the weapon 100 and can detect an operational state of the weapon 1000 from the various inter-marker distances. For example, the marker 1015 on the rear of the slide mechanism 1030 will move away from the body marker(s) 1005, 1010 when a round is 'fired' due to movement of the slide mechanism 1030 powered by a gas magazine 1025.

In another exemplary embodiment, the passive tracking markers 1005, 1010, and 1015 and a wireless radio frequency communication unit 1020 are used. Electronics on the weapon 1000 can collect operational data, such as rounds fired, and relay the data to the motion capture simulation system 100 via wireless transmission (radio or optical). The weapon 1000 can further report data such as orientation, acceleration, light, or laser activation, to mention a few more examples without attempting to be exhaustive.

Turning now to FIG. 11, this figure illustrates a representative flowchart of an exemplary process 1100 in which passive markers convey operational state information about a motion capture implement associated with motion capture simulation in accordance certain embodiments of the present invention.

The following discussion of process 1100, which is entitled "Communicate State," will refer to certain elements illustrated in FIGS. 10A and 11. However, those of skill in the art having benefit of this disclosure will appreciate that various embodiments of process 1100 can function with and/or accommodate a wide range of devices, systems, and hardware (including elements illustrated in other figures as well as elements not expressly illustrated) and can function in a wide range of applications and situations. Accordingly, such referenced elements are exemplary, are provided without being exhaustive and without limitation, and are among many others supported by the present invention.

At step 1105, the participant 502 fires the weapon 1000 in the motion capture environment. At step 1110, under power from a gas magazine 1025 or a battery, the slide mechanism 1030 of the weapon 1000 moves. At step 1120, the marker 1015 moves as it is attached to a moving element of the weapon 1000. The movement of the marker 1015 is relative to the markers 1005 and 1010.

Accordingly, at step 1125 images captured by overhead cameras (e.g. of the motion capture devices 104) register a change in separation between the marker 1015 and one or more of the markers 1010 and 1005. The motion capture simulation system 100 thus detects that the participant 502 has fired the weapon 1000. Process 1100 ends following step 1125 and may begin again anytime a participant 502 shoots.

Turning now to FIG. 12, this figure illustrates a representative weapon 1200, specifically a fully automatic machine-gun as an exemplary embodiment of a motion capture implement, associated with motion capture simulation in accordance certain embodiments of the present invention. The weapon 1200 illustrated in FIG. 12 exemplifies crew serve weapons, such as the M249, 50 caliber Browning, mini gun, grenade launcher, that can be monitored for location and operational state in a motion capture environment as described above.

Accordingly, the present technology supports obtaining information from weapons that are usually mounted or tethered in real-life scenarios. Further examples can include still larger weapons systems mounted on vehicles (personnel carriers, helicopters, boats etc.), such as large caliber machine-guns, mini guns and grenade launchers. In a motion capture environment, such weapons can be powered from an external power source for more realistic recoil generation, can utilize wired or wireless communication, and can provide high density data streams to/from the weapon as appropriate.

In the illustrated embodiment, the weapon 1200 comprises passive tracking markers 1225, and active light emitting diodes 515, each of which can function as described above.

Due to the availability of an external power source, highly realistic recoil can be generated. Power can come in the form of high current/voltage electrical power or in the form of a compressed air or oil hose 1220 to drive a piston associated with a heavy recoil mechanism 1210. Communication to the motion capture simulation system 100 can occur either via wired (ethernet, serial or similar) or wirelessly via radio frequency or optical communication.

Via tether, high density data streams can be provided to the weapon 1200. Tactile feedback can be provided, including with visual feedback coming from a built-in dedicated display (not illustrated). The tether can connect with the computing elements of the motion capture simulation system 100, to a man wearable computer, or to some other mobile device providing data or power locally.

Turning now to FIG. 13, this figure illustrates a representative wand 1300, as an exemplary embodiment of a motion capture implement, associated with motion capture simulation in accordance certain embodiments of the present invention. The wand 1300 exemplifies an embodiment of a motion capture implement that is not necessarily a weapon. The wand 1300 may be utilized as an indicator (e.g. pointing wand) and may further be representative of implements that signify elements of a complex system that a participant 502 may work with, for example in connection with assembly or physical control. Active tracking markers 1320 and passive tracking markers 1225 on the wand 1300 facilitate identification and tracking as discussed above. The handle 1310 of the wand 1300 may contain electronics and a battery. The participant 500 can engage the button switch 1330 to trigger LED activation or radio frequency signal generation to communicate operational state wirelessly as discussed above.

Additional examples of devices that the participant 500 may use could include (but is not limited to) a pointing wand used by a strategic planner overlooking a virtual battlefield, a lever/joystick/wheel to operate equipment, a riot shield carried by a police officer (see FIG. 14 as discussed below) or a knock-knock bar operated by a SWAT team to force a doorway or something as simple as a flashlight.

Turning now to FIG. 14, this figure illustrates three representative weapons 1425, 1450, 1475, as exemplary embodiments of motion capture implements, associated with motion capture simulation in accordance certain embodiments of the present invention. As illustrated in FIG. 14, motion capture implements outfitted with active and/or passive markers can comprise objects that can be held, brandished, swung, thrown, pitched, cast away, rigged, left behind, or otherwise used by the participant 502.

FIG. 14 specifically illustrates a grenade 1425 as representative of a throwing weapon that might alternative comprise a rock or other object. Such items can comprise one or more markers 1420 on the body of the motion capture implement. Embedded electronics 1465 can provide one- or two-way radio or optical communication with the motion capture simulation system 100. The motion capture implements can resemble real world objects and be manipulated in a manner familiar to the participant 502. For example, a smoke grenade could be thrown through a (virtual) window and set to start smoking with a 5-second delay. The motion capture implement could be thrown in a familiar manner to the participant 502, after activating the device (e.g. by pulling a grenade pin). As another example, a booby trap could similarly be outfitted for reporting state and tracking position when the participant 502 sets the trap. FIG. 14 further illustrates a baton 1475 and a shield 1450 as two additional exemplary weapon embodiments, respectively used for hitting and blocking. Those of ordinary skill in the art having benefit of this disclosure will appreciate that a wide variety of physical things can be outfitted with marker technology and deployed in a motion capture environment as motion capture elements.

Technology for communicating information about hardware in a motion capture environment, including without limitation a motion capture simulation, has been described. From the description, it will be appreciated that an embodiment of the present invention overcomes the limitations of the prior art. Those skilled in the art will appreciate that the present invention is not limited to any specifically discussed application or implementation and that the embodiments described herein are illustrative and not restrictive. The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

What is claimed is:

1. A method comprising the steps of:
    receiving first light emanating from a first spot on a weapon in a motion capture environment;
    receiving second light emanating from a second spot on the weapon that slides relative to the first spot when a trigger of the weapon is pulled;
    processing the first and second received light to determine position of the second spot relative to the first spot; and
    determining a firing state of the weapon based on the determined position.

2. The method of claim 1, wherein a camera receives and processes the first and second light,
    wherein the first light and the second light are visible to the camera, and
    wherein the weapon is handheld.

3. The method of claim 1, wherein the first light emanates from a first passive reflector that is attached to the weapon in a fixed position relative to a barrel of the weapon, and
    wherein the second light emanates from a second passive reflector that is attached to a slide of the weapon.

* * * * *